US011927114B2

(12) United States Patent
Ouchi

(10) Patent No.: US 11,927,114 B2
(45) Date of Patent: Mar. 12, 2024

(54) ROTOR OF STEAM TURBINE, STEAM TURBINE, AND METHOD FOR FIXING ROTOR BLADE

(71) Applicant: MITSUBISHI HEAVY INDUSTRIES COMPRESSOR CORPORATION, Tokyo (JP)

(72) Inventor: Tomotaka Ouchi, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 0 days.

(21) Appl. No.: 18/066,498

(22) Filed: Dec. 15, 2022

(65) Prior Publication Data

US 2023/0193767 A1 Jun. 22, 2023

(30) Foreign Application Priority Data

Dec. 17, 2021 (JP) ................................ 2021-205124

(51) Int. Cl.
*F01D 5/30* (2006.01)
*F01D 5/32* (2006.01)

(52) U.S. Cl.
CPC ............... *F01D 5/303* (2013.01); *F01D 5/32* (2013.01); *F05D 2220/31* (2013.01); *F05D 2230/60* (2013.01); *F05D 2240/24* (2013.01)

(58) Field of Classification Search
CPC .......... F01D 5/30; F01D 5/3053; F01D 5/303; F01D 5/323; F01D 5/32; F05D 2260/30;
(Continued)

(56) References Cited

U.S. PATENT DOCUMENTS 2,843,356 A * 7/1958 Hull, Jr. .................. F01D 5/326
74/568 R
2,867,408 A * 1/1959 Bolter ..................... F01D 5/326
416/193 A (Continued)

FOREIGN PATENT DOCUMENTS

EP 2613000 A2 * 7/2013 .............. F01D 5/22
JP 2010-185367 A 8/2010

(Continued)

*Primary Examiner* — Brian P Wolcott
*Assistant Examiner* — Arthur Paul Golik
(74) *Attorney, Agent, or Firm* — Osha Bergman Watanabe & Burton LLP

(57) ABSTRACT

A rotor of a steam turbine includes a plurality of rotor blades attached to a disk portion and a key configured to restrict movement of each of the plurality of rotor blades in an axial direction. The disk portion includes a blade embedding groove and a circumferential groove. The plurality of rotor blades include a first rotor blade and a second rotor blade adjacent to the first rotor blade on one side in a circumferential direction. A platform of the first rotor blade includes an access groove communicating with the circumferential groove, and a platform of the second rotor blade includes a second side surface facing a first side surface in the circumferential direction and a key accommodating groove communicating with the access groove in the circumferential direction. A key is arranged in the circumferential groove and the key accommodating groove.

7 Claims, 22 Drawing Sheets

(58) Field of Classification Search
CPC ............. F05D 2260/36; F05D 2260/37; F05D 2240/24; F16B 2/24; F16B 2/241; F16B 2/243; F16B 2/245; F16B 7/0413
See application file for complete search history.

(56) References Cited

U.S. PATENT DOCUMENTS 3,000,613 A * 9/1961 Welsh ..................... F01D 5/326 416/221
3,202,398 A * 8/1965 Webb ...................... F01D 5/323 416/193 A
3,904,317 A * 9/1975 Cardin .................... F01D 5/326 416/220 R
4,915,587 A * 4/1990 Pisz ........................ F01D 5/326 416/221

FOREIGN PATENT DOCUMENTS

KR 101689085 B1 * 1/2017
KR 102157899 B1 * 9/2020

* cited by examiner

ROTOR OF STEAM TURBINE, STEAM TURBINE, AND METHOD FOR FIXING ROTOR BLADE

BACKGROUND OF THE INVENTION

Field of the Invention

The present disclosure relates to a rotor of a steam turbine, a steam turbine, and a method for fixing a rotor blade.

Priority is claimed on Japanese Patent Application No. 2021-205124, filed on Dec. 17, 2021, the content of which is incorporated herein by reference.

Description of Related Art

A steam turbine includes a rotor that rotates about an axis and a casing that covers the rotor. The rotor has a rotor shaft extending in an axial direction about the axis, and a plurality of rotor blade rows fixed to an outer periphery of the rotor shaft and arranged in the axial direction. The steam turbine has a stator vane row fixed to an inner periphery of the casing and arranged upstream side of each row of the plurality of rotor blade rows. The rotor blade row of each row includes a plurality of rotor blades in a circumferential direction of a rotor disk. The rotor blade protrudes radially from an outer peripheral surface of the rotor disk.

The rotor blades are fixed to the rotor disk by inserting blade roots of the rotor blades into a plurality of blade grooves formed on the outer peripheral surface of the rotor disk at intervals in the circumferential direction. The blade groove penetrates the rotor disk in the axial direction. The blade root of the rotor blade is inserted into the blade groove of the rotor disk in the axial direction, and thus, attached to the rotor disk.

When the steam turbine operates, steam sent into the casing flows in the casing from a first side toward a second side in the axial direction. Therefore, a force that presses from the first side to the second side in the axial direction acts on the rotor blade due to a fluid pressure of the steam. It is necessary to prevent the rotor blade from shifting in the axial direction with respect to the blade groove due to the force pressed by this steam.

Meanwhile, for example, Patent Document 1 describes a structure in which a key (fixing member) is used to restrain a rotor blade in the axial direction with respect to a blade groove of a rotor disk. In the structure of Patent Document 1, the key is inserted into the second notch portion formed in the rotor disk through a first notch portion formed to penetrate a platform of the rotor blade. Then, a part of an outer peripheral side of the key is covered with the platform, and the key is plastically deformed so that a thrust force of the rotor blade can be supported.

[Patent Document 1] Japanese Unexamined Patent Application, First Publication No. 2010-185367

SUMMARY OF THE INVENTION

However, in the configuration described in Patent Document 1, after the key is inserted into the second notch portion through the first notch portion, the key should be plastically deformed, which is troublesome to attach the key. Further, when the plastic deformation of the key is incomplete, the key may not be sufficiently fixed.

The present disclosure provides a rotor of a steam turbine, a steam turbine, and a method for fixing a rotor blade, which can easily and reliably restrain the rotor blade by a key.

According to an aspect of the present disclosure, there is provided a rotor of a steam turbine, the rotor including: a shaft core portion formed in a columnar shape about an axis; a disk portion extending to an outer side in a radial direction with respect to the shaft core portion, in which the radial direction is based on the axis; a plurality of rotor blades attached to the disk portion; and a key configured to restrict movement of each of the plurality of rotor blades with respect to the disk portion in an axial direction in which the axis extends, in which the disk portion includes a plurality of blade embedding grooves recessed to an inner side in the radial direction from an outer peripheral surface of the disk portion, extending in the axial direction, and formed at intervals in a circumferential direction about the axis, and a circumferential groove recessed to the inner side in the radial direction from the outer peripheral surface and extending in the circumferential direction, each of the plurality of rotor blades includes a blade root embedded in each of the blade embedding grooves, a platform arranged on the outer side in the radial direction with respect to the disk portion and protruding to both sides in the circumferential direction with respect to the blade root, and a blade body extending to the outer side in the radial direction from the platform, the plurality of rotor blades include a first rotor blade and a second rotor blade adjacent to the first rotor blade on one side in the circumferential direction, the platform of the first rotor blade includes a first side surface of the second rotor blade facing a platform of the second rotor blade in the circumferential direction, a first end surface facing the axial direction, and an access groove recessed to open in the axial direction and the circumferential direction at a corner portion formed by the first side surface and the first end surface and communicating with the circumferential groove, the platform of the second rotor blade includes a second side surface facing the first side surface in the circumferential direction, and a key accommodating groove recessed in the circumferential direction from the second side surface, communicating with the circumferential groove in the radial direction, and communicating with the access groove in the circumferential direction, and the key is arranged in the circumferential groove and the key accommodating groove.

According to another aspect of the present disclosure, there is provided a steam turbine including the rotor of a steam turbine described above.

According to still another aspect of the present disclosure, there is provided a method for fixing the rotor blade in the rotor of a steam turbine described above, the method including: a step of attaching the second rotor blade to the disk portion; a step of inserting the key into the circumferential groove; a step of moving the key in the circumferential direction in the circumferential groove and inserting the key into the key accommodating groove; and a step of attaching the first rotor blade to the disk portion.

According to the rotor of a steam turbine, the steam turbine, and the method for fixing a rotor blade of the present disclosure, the rotor blade can be easily and reliably restrained by the key.

DETAILED DESCRIPTION OF THE INVENTION

Hereinafter, embodiments for implementing a rotor of a steam turbine, a steam turbine, and a method for fixing a rotor blade according to the present disclosure will be described with reference to the accompanying drawings. However, the present disclosure is not limited to embodiments.

First Embodiment (Overall Configuration of Steam Turbine)

Figure 1:
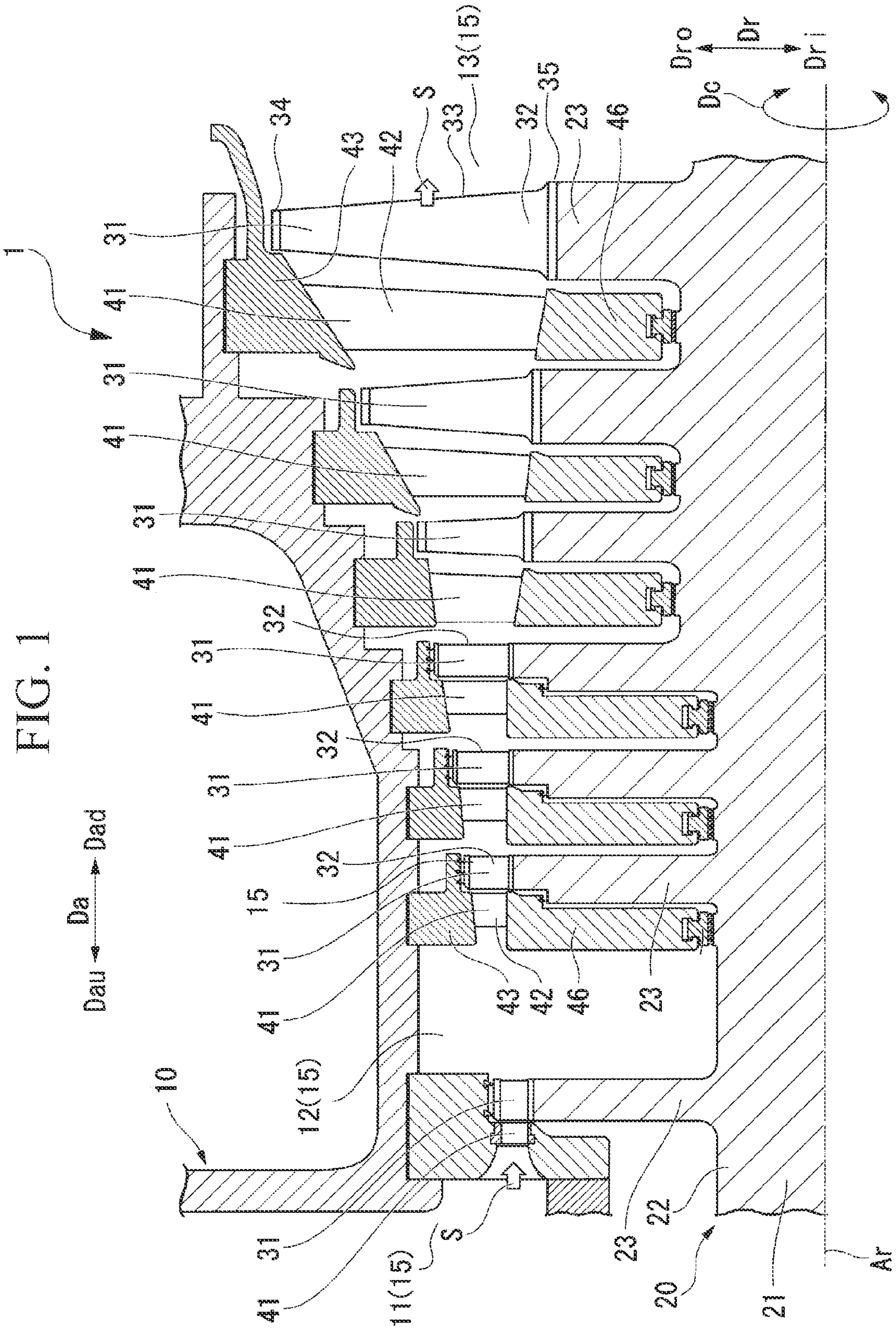
FIG. 1 is a cross-sectional view of a steam turbine according to an embodiment of the present disclosure.

As shown in FIG. 1, a steam turbine 1 of the present embodiment includes a rotor 20 that rotates about an axis Ar and a casing 10 that rotatably covers the rotor 20.

For the convenience of the following description, a direction in which the axis Ar extends is referred to as an axial direction Da. Further, a first side in the axial direction Da is referred to as an upstream side Dau, and a second side in the axial direction Da is referred to as a downstream side Dad. Further, a radial direction in the rotor 20 with respect to the axis Ar is simply referred to as a radial direction Dr. Further, a side that approaches the axis Ar in the radial direction Dr is referred to as an inner side Dri in the radial direction Dr, and a side in the radial direction Dr that is opposite to the inner side Dri in the radial direction Dr is referred to as an outer side Dro in the radial direction Dr. Further, a circumferential direction of the rotor 20 about the axis Ar is simply referred to as a circumferential direction Dc.

Figure 2:
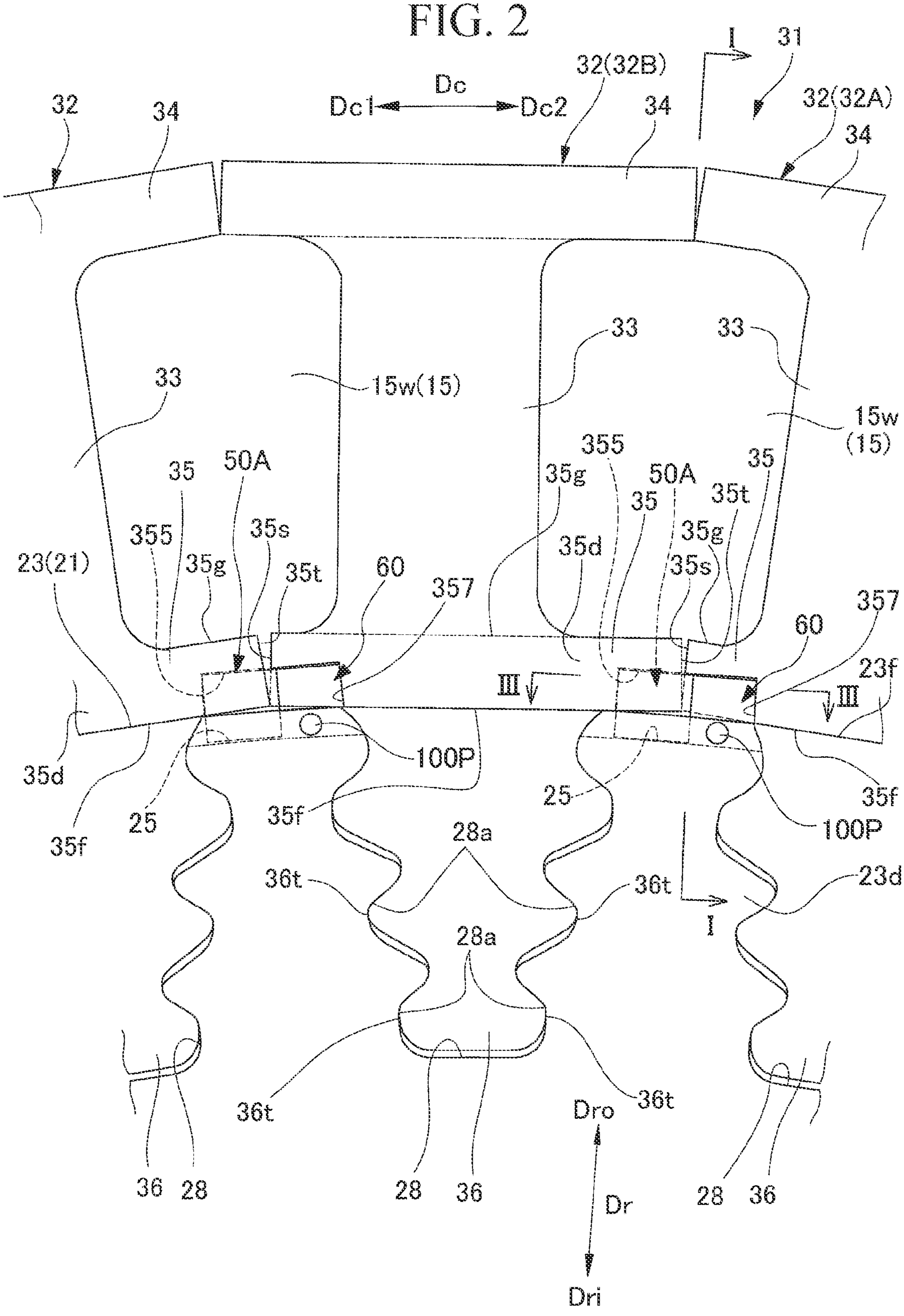
FIG. 2 is a view of a part of a rotor blade of a steam turbine according to a first embodiment of the present disclosure as viewed from a downstream side in an axial direction.

The rotor 20 has a rotor shaft 21, a rotor blade row 31, a key 50A (refer to FIG. 2), and a restraining member 60 (refer to FIG. 2). The rotor shaft 21 extends in the axial direction Da about the axis Ar. The rotor shaft 21 has a shaft core portion 22 and a plurality of disk portions 23. The shaft core portion 22 is formed in a columnar shape extending in the axial direction Da. The plurality of disk portions 23 extend from the shaft core portion 22 to the outer side Dro in the radial direction Dr. The plurality of disk portions 23 are arranged at intervals in the axial direction Da. The disk portion 23 is arranged to correspond to each of the plurality of rotor blade rows 31.

A nozzle chamber 11 into which steam S flows in from the outside, a main flow path chamber 12 in which steam S from the nozzle chamber 11 flows, and an exhaust chamber 13 in which steam S flowing from the main flow path chamber 12 is discharged are formed in the casing 10. The nozzle chamber 11, the main flow path chamber 12, and the exhaust chamber 13 constitute a steam main flow path 15 through which high-pressure steam S flows in the casing 10.

The high-pressure steam S flows through the steam main flow path 15 from the upstream side Dau toward the downstream side Dad in the order of the nozzle chamber 11, the main flow path chamber 12, and the exhaust chamber 13 while the pressure gradually decreases. That is, a flow direction of the steam S in the present embodiment is a direction from the upstream side Dau toward the downstream side Dad in the axial direction Da. The steam main flow path 15 is formed in an annular shape around the rotor shaft 21. The steam main flow path 15 extends in the axial direction Da across a plurality of rotor blade rows 31 and a plurality of stator vane rows 41.

As shown in FIGS. 1 and 2, the rotor blade row 31 is attached to an outer periphery of the disk portion 23, which is an outer peripheral portion of the rotor shaft 21. A plurality of rotor blade rows 31 are arranged at intervals in the axial direction Da of the rotor shaft 21. In the case of the present embodiment, the number of rotor blade rows 31 is seven. Therefore, in the case of the present embodiment, the rotor blade rows 31 of a first stage to a seventh stage are provided.

Each rotor blade row 31 has a plurality of rotor blades 32 arranged in the circumferential direction Dc. The plurality of rotor blades 32 is attached to the disk portion 23. Each rotor blade 32 has a blade root 36 (refer to FIG. 2), a platform 35, a shroud 34, and a blade body 33.

As shown in FIG. 2, the blade root 36 is embedded in a blade embedding groove 28, which will be described later, formed in the disk portion 23. The blade root 36 is formed to extend from a platform inner peripheral surface 35*f* of the platform 35 described later to the inner side Dri in the radial direction Dr. The blade root 36 has an engaging convex portion 36*t* protruding toward both sides in the circumferential direction Dc. The engaging convex portions 36*t* are provided at a plurality of locations formed at intervals in the radial direction Dr. The plurality of engaging convex portions 36*t* are formed so that a protrusion dimension in the circumferential direction Dc gradually decreases toward the inner side Dri in the radial direction Dr. As a result, the blade root 36 has a so-called Christmas tree shape.

The disk portion 23 is formed with the blade embedding groove 28 in which the blade root 36 is embedded. The plurality of blade embedding grooves 28 are formed at intervals in the circumferential direction Dc. The blade embedding groove 28 is recessed from the outer peripheral surface of the disk portion 23 to the inner side Dri in the radial direction Dr. The blade embedding groove 28 extends in the axial direction Da and is formed to penetrate the disk portion 23 in the axial direction Da. The blade embedding groove 28 is formed to correspond to the outer peripheral shape of the blade root 36. The blade embedding groove 28 has an engaging concave portion 28*a* to which the engaging convex portion 36*t* is engaged. The engaging concave portions 28*a* are formed in the blade embedding groove 28 at a plurality of locations formed at intervals in the radial direction Dr to be recessed toward both sides in the circumferential direction Dc. Further, the disk portion 23 has an outer peripheral surface 23*f* facing the outer side Dro in the radial direction Dr and a disk surface 23*d* facing the downstream side Dad in the axial direction Da. The disk surface 23*d* is a surface orthogonal to the outer peripheral surface 23*f* The outer peripheral surface 23*f* is a surface of the disk portion 23 located on the outermost Dro in the radial direction Dr.

The platform 35 is arranged on the outer side Dro in the radial direction Dr with respect to the disk portion 23. The platform 35 extends in the circumferential direction Dc. The platform 35 protrudes to both sides of the circumferential direction Dc with respect to the blade root 36. The platform 35 has a rectangular shape that is longer in the axial direction Da than the circumferential direction Dc when viewed from the outer side Dro in the radial direction Dr (refer to FIG. 5). The platforms 35 of the plurality of rotor blades 32 are arranged in the circumferential direction Dc to form a cylindrical shape about the axis Ar as a whole. The platform 35 has a platform inner peripheral surface 35*f* facing the inner side Dri in the radial direction Dr and a platform outer peripheral surface 35*g* facing the outer side Dro in the radial direction Dr. Further, the platform 35 has a first side surface 35*s* facing the circumferential direction Dc and a second side surface 35*t* facing the side opposite to the first side surface 35*s* in the circumferential direction Dc. Further, the platform 35 has a first end surface 35*d* facing the downstream side Dad in the axial direction Da.

The blade body 33 extends from the platform outer peripheral surface 35*g* to the outer side Dro in the radial direction Dr. That is, the blade body 33 is arranged on the side opposite to the blade root 36 with the platform 35 interposed therebetween in the radial direction Dr. The blade body 33 is integrally formed with the shroud 34. The blade body 33 is arranged in the steam main flow path 15. The blade body 33 has an airfoil cross section when viewed from the outer side in the radial direction Dr.

The shroud 34 is connected to an end portion of the outer side Dro in the radial direction Dr with respect to the blade body 33. That is, the shroud 34 is arranged on the side opposite to the platform 35 with the blade body 33 interposed therebetween in the radial direction Dr. The shroud 34 extends in the circumferential direction Dc. The shrouds 34 of the plurality of rotor blades 32 have a cylindrical shape as a whole by arranging in the circumferential direction Dc.

A space surrounded by the blade bodies 33 adjacent to each other in the circumferential direction Dc and the shrouds 34 and the platform 35 facing each other in the radial direction Dr is an inter-blade flow path 15*w* through which the steam S flows. By arranging the plurality of rotor blades 32 in the circumferential direction Dc in the casing 10, a plurality of inter-blade flow paths 15*w* are formed in the circumferential direction Dc. The plurality of inter-blade flow paths 15*w* arranged in the circumferential direction Dc form a part of the steam main flow path 15 through which the steam S flows.

As shown in FIG. 1, the steam turbine 1 includes a plurality of stator vane rows 41 fixed to the inner peripheral surface of the casing 10 and arranged at intervals in the axial direction Da. In the case of the present embodiment, the number of the stator vane rows 41 is seven, which is the same as the number of the rotor blade rows 31. Therefore, in the case of the present embodiment, the stator vane rows 41 from a first stage to a seventh stage are provided. The plurality of stator vane rows 41 are arranged adjacent to the upstream side Dau with respect to each rotor blade row 31.

The stator vane row 41 has a plurality of stator vanes 42, an outer ring 43, and an inner ring 46. The plurality of stator vanes 42 are arranged at intervals in the circumferential direction Dc. The outer ring 43 is formed in an annular shape and is arranged on the outer side Dro in the radial direction Dr with respect to the plurality of stator vanes 42. The inner ring 46 is formed in an annular shape and is arranged on the inner side Dri in the radial direction Dr with respect to the plurality of stator vanes 42. That is, the plurality of stator vanes 42 are arranged between the outer ring 43 and the inner ring 46. The stator vane 42 is fixed to the outer ring 43 and the inner ring 46. A space between the outer ring 43 and the inner ring 46 and having an annular shape forms a part of the steam main flow path 15 through which the steam S flows.

In such a steam turbine 1, the steam S is sent from the upstream side Dau of the casing 10 through the nozzle chamber 11. This steam S passes through the main flow path chamber 12 and flows to the exhaust chamber 13 of the downstream side Dad. As a result, the rotor shaft 21 rotates around the axis Ar, and the rotor blades 32 rotate about the axis Ar together with the disk portion 23. In this case, in each rotor blade 32, the steam S flows in the inter-blade flow path 15*w* between the blade bodies 33 adjacent to each other in the circumferential direction Dc.

(Fixed Structure of Rotor Blade)

As shown in FIGS. 2 to 5, in the steam turbine 1, each rotor blade 32 is restricted from moving in the axial direction Da with respect to the disk portion 23 by the key 50A. The key 50A is arranged inside a circumferential groove 25 formed in the disk portion 23 and a key accommodating groove 355 formed in the platform 35.

Figure 3:
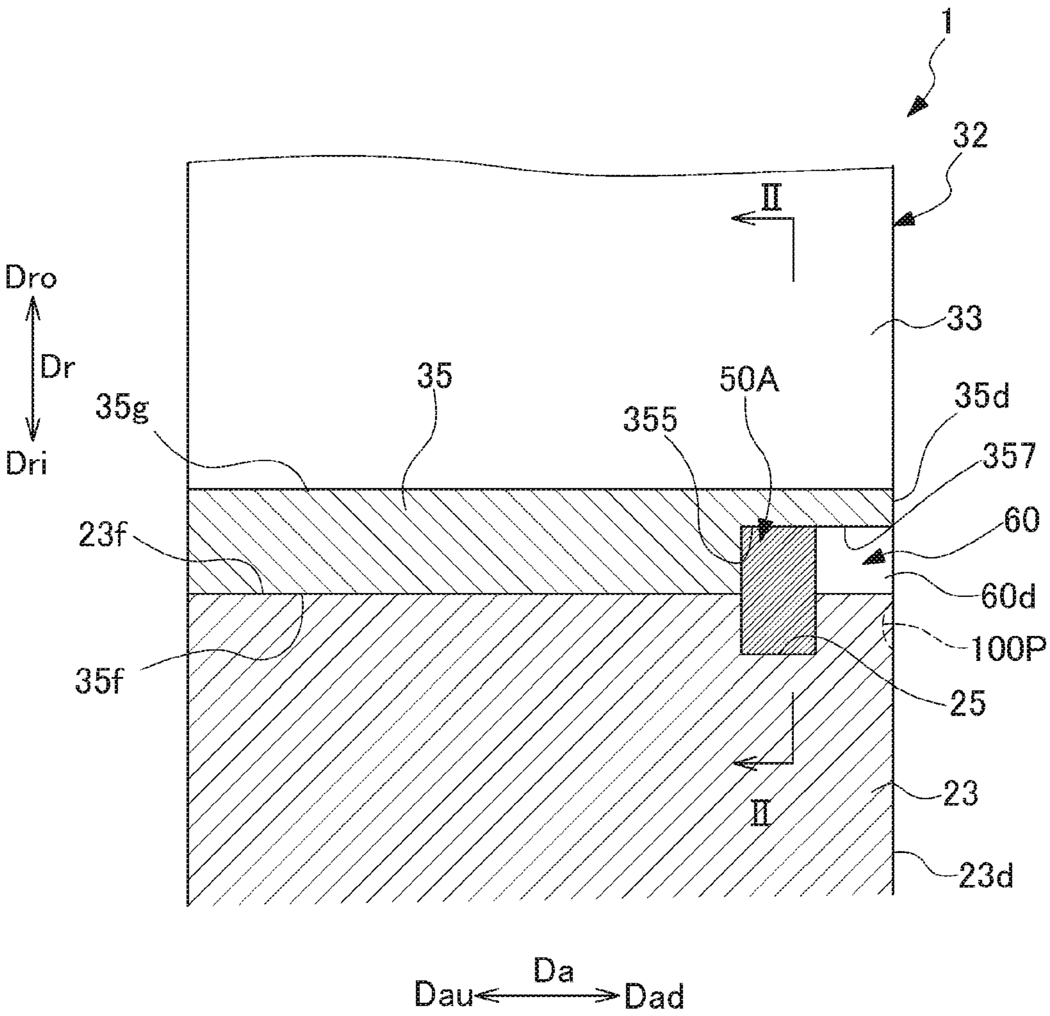
FIG. 3 is a cross-sectional view schematically showing a fixed structure of the rotor blade according to the first embodiment of the present disclosure, as viewed from a circumferential direction, and is a cross-sectional view taken along line I-I of FIG. 2.
Figure 4:
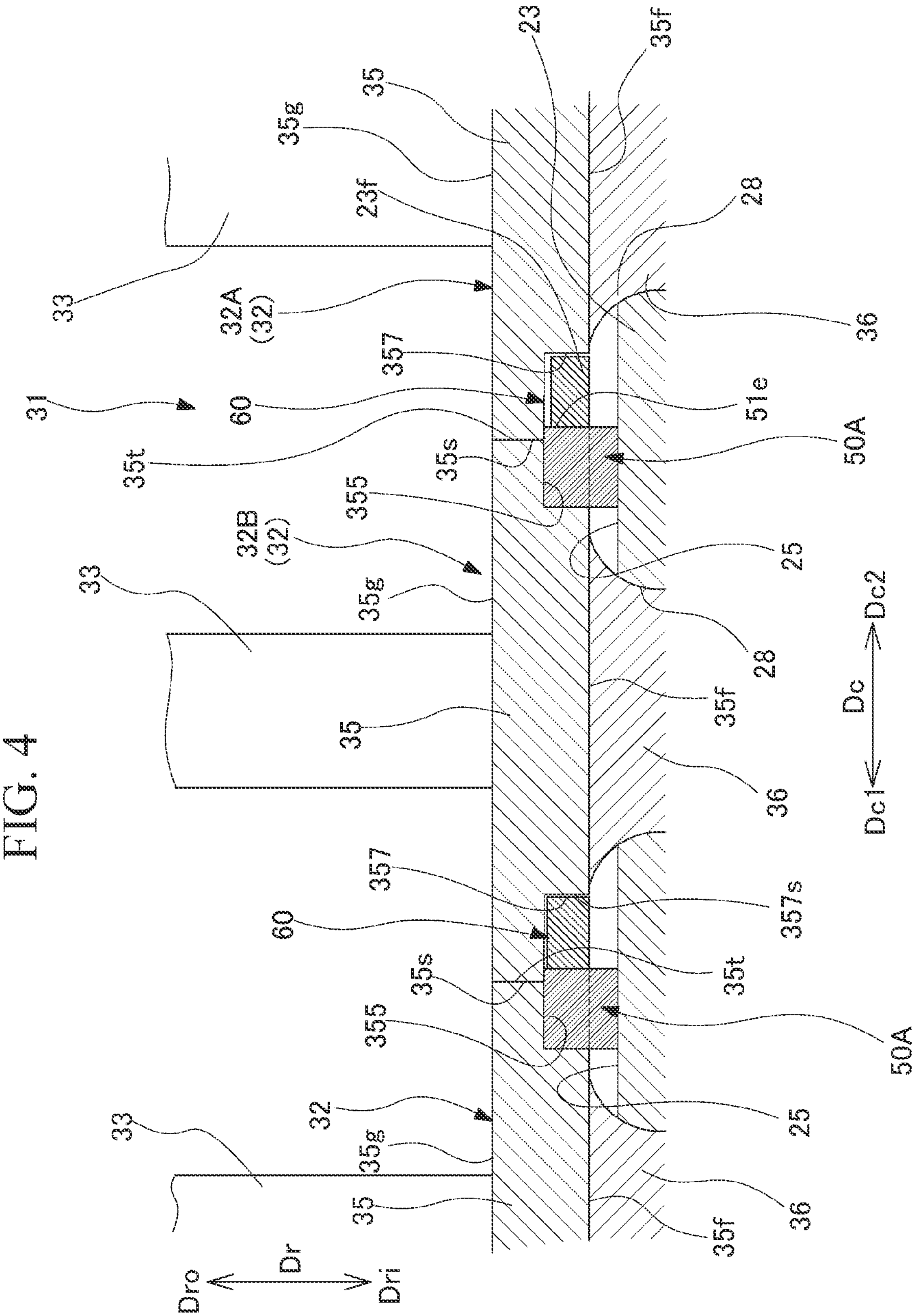
FIG. 4 is a cross-sectional view schematically showing the fixed structure of the rotor blade according to the first embodiment of the present disclosure, as viewed from the axial direction, and is a cross-sectional view taken along line II-II of FIG. 3.
Figure 5:
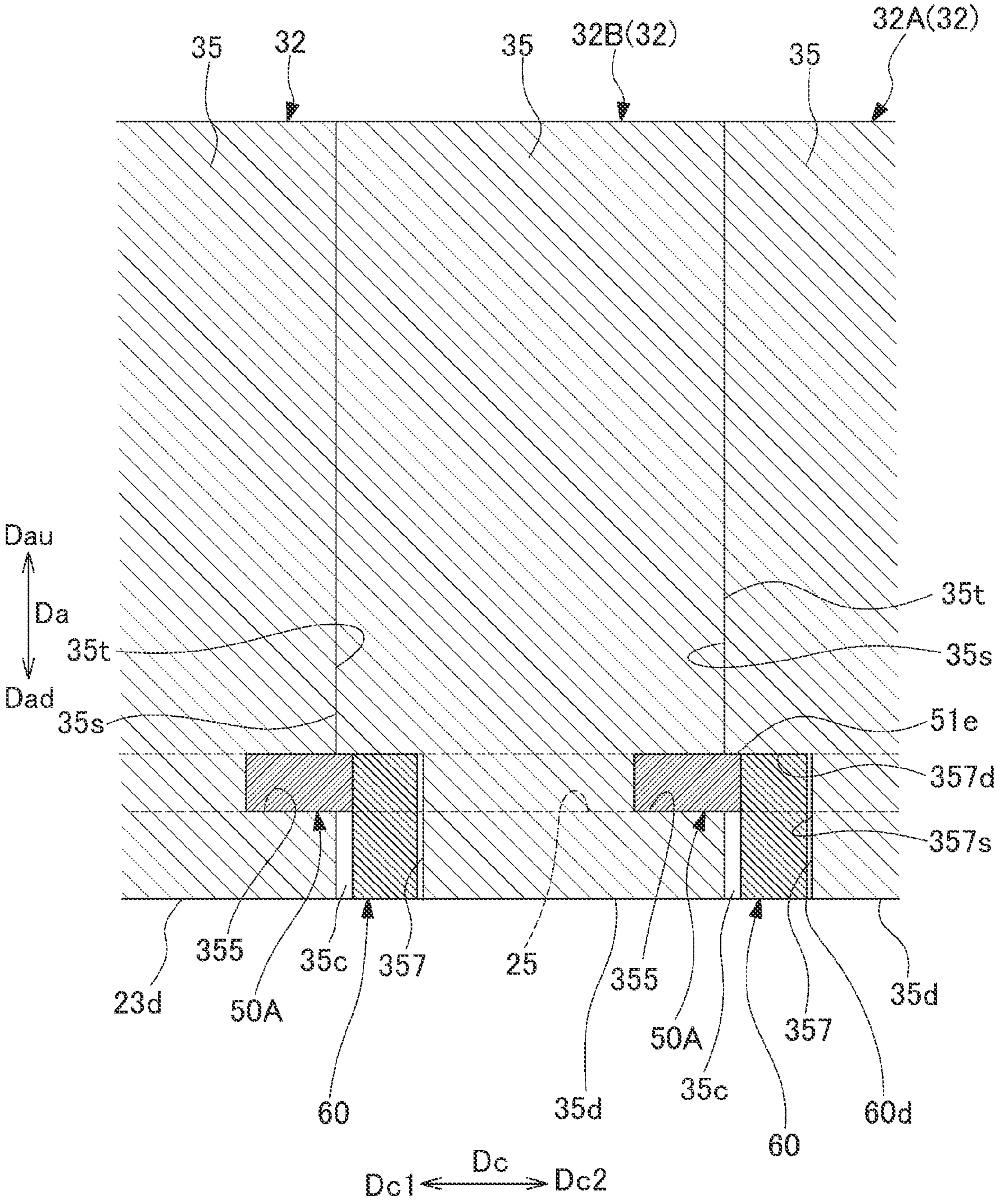
FIG. 5 is a cross-sectional view schematically showing the fixed structure of the rotor blade according to the first embodiment of the present disclosure, as viewed from a radial direction, and is a cross-sectional view taken along line of FIG. 2.

As shown in FIG. 3, the circumferential groove 25 is formed on the outer peripheral surface 23*f* of the disk portion 23 on the downstream side Dad from an intermediate portion in the axial direction Da. The circumferential groove 25 is formed in a size that allows the key 50A to be inserted. The circumferential groove 25 is formed to be recessed from the outer peripheral surface 23*f* of the disk portion 23 to the inner side Dri in the radial direction Dr. The circumferential groove 25 is formed at a position shifted to the upstream side Dau with respect to the disk surface 23*d* in the axial direction Da so as not to be connected to the disk surface 23*d*. As shown in FIGS. 4 and 5, the circumferential groove 25 extends in the circumferential direction Dc. In the present embodiment, the circumferential groove 25 is formed between the blade embedding grooves 28 to connect the adjacent blade embedding grooves 28 in the circumferential direction Dc. That is, the circumferential groove 25 is formed to overlap the platform 35 of the adjacent rotor blades 32 in the circumferential direction Dc. The circumferential groove 25 may be formed only in a portion where the key 50A is inserted in the circumferential direction Dc.

The key accommodating groove 355 is formed in the platform 35 at an end portion of the other side Dc2 in the circumferential direction Dc. The key accommodating groove 355 is formed in a size that allows the key 50A to be inserted. The key accommodating groove 355 is formed at a position overlapping the circumferential groove 25 in the axial direction Da and the circumferential direction Dc in a state where the blade root 36 is embedded in the blade embedding groove 28. The key accommodating groove 355 is formed in the platform 35 to be recessed from the second side surface 35*t* facing the other side Dc2 in the circumferential direction Dc to the one side Dc1 in the circumferential direction Dc. The key accommodating groove 355 is recessed from the platform inner peripheral surface 35*f* to the outer side Dro in the radial direction Dr. The key accommodating groove 355 is formed at a position distant from the first end surface 35*d* in the axial direction Da. That is, the key accommodating groove 355 is formed to open only at the second side surface 35*t* and the platform inner peripheral surface 35*f* The key accommodating groove 355 communicates with the circumferential groove 25 in the radial direction Dr. The key accommodating groove 355 communicates with an access groove 357 described later in the circumferential direction Dc.

The platform 35 has the access groove 357. The access groove 357 is formed at a position overlapping the key accommodating groove 355 when viewed from the circumferential direction Dc. The access groove 357 is formed in a size that allows the key 50A to be inserted. The access groove 357 is formed at an end portion on one side Dc1 in the circumferential direction Dc of the platform 35. The access groove 357 is formed in the platform 35 by being recessed from the first side surface 35*s* facing the one side Dc1 in the circumferential direction Dc to the other side Dc2 in the circumferential direction Dc. The access groove 357 is recessed in the platform 35 from the first end surface 35*d* facing the downstream side Dad in the axial direction Da to the upstream side Dau in the axial direction Da. That is, the access groove 357 is formed to open to the downstream side Dad in the axial direction Da and the one side Dc1 in the circumferential direction Dc at a corner portion 35*c* formed by the first side surface 35*s* and the first end surface 35*d*. A depth (length) of the access groove 357 in the circumferential direction Dc is formed deeper than that of the key accommodating groove 355 and the key 50A. The access groove 357 is formed at a position overlapping the key accommodating groove 355 when viewed from the circumferential direction Dc. The access groove 357 communicates with the circumferential groove 25 in the radial direction Dr. The access groove 357 of the present embodiment has an access groove side surface 357*s* facing the one side Dc1 in the circumferential direction Dc, and an access groove end surface 357*d* facing the downstream side Dad in the axial direction Da.

In the plurality of rotor blades 32, one of a pair of rotor blades 32 adjacent to each other in the circumferential direction Dc is referred to as a first rotor blade 32A, and the rotor blade 32 arranged on one side Dc1 in the circumferential direction Dc with respect to the first rotor blade 32A is referred to as a second rotor blade 32B. The first side surface 35*s* of the first rotor blade 32A and the second side surface 35*t* of the second rotor blade 32B face each other in the circumferential direction Dc. Therefore, the access groove 357 formed in the platform 35 of the first rotor blade 32A and the key accommodating groove 355 formed in the platform 35 of the second rotor blade 32B communicate with each other in the circumferential direction Dc. The circumferential groove 25 is formed from the position overlapping the platform 35 of the second rotor blade 32B to the position overlapping the platform 35 of the first rotor blade 32A when viewed from the radial direction Dr. Therefore, the circumferential groove 25 communicates with the access groove 357 of the first rotor blade 32A and the key accommodating groove 355 of the second rotor blade 32B.

The key 50A restrains the movement of the rotor blade 32 (second rotor blade 32B) in the axial direction Da with respect to the disk portion 23. The key 50A is inserted into the key accommodating groove 355 and the circumferential groove 25. The key 50A of the present embodiment has, for example, a rectangular parallelepiped block shape. The key 50A has a shape that allows movement in the circumferential groove 25 in the circumferential direction Dc. The key 50A can move between the key accommodating groove 355 and the access groove 357 by moving in the circumferential direction Dc in the circumferential groove 25. The key 50A has the same length in the axial direction Da as the circumferential groove 25 and the key accommodating groove 355 to be in sliding contact with the circumferential groove 25 and the key accommodating groove 355. As shown in FIGS. 3 and 4, a region on the inner side Dri in the radial direction Dr in the key 50A is accommodated in the circumferential groove 25. The region of the outer side Dro in the radial direction Dr in the key 50A is inserted into the key accommodating groove 355.

As shown in FIG. 4, a region including an end portion 51*e* of the other side Dc2 in the circumferential direction Dc, which is a part of the key 50A, protrudes from the second side surface 35*t* of the platform 35 to the other side Dc2 in the circumferential direction Dc in a state where the key 50A is accommodated in the circumferential groove 25 and the key accommodating groove 355. As shown in FIG. 5, even when the key 50A is accommodated in the circumferential groove 25 and the key accommodating groove 355, the region including the end portion 51*e* is in contact with the access groove end surface 357*d*. Further, the key 50A is formed in such a size that the key 50A does not protrude into the key accommodating groove 355 when the key 50A is accommodated in the circumferential groove 25 and the access groove 357.

The restraining member 60 is arranged in the access groove 357 of the first embodiment. The restraining member 60 restrains the movement of the key 50A approaching the access groove side surface 357*s* in the circumferential direction Dc. The restraining member 60 is arranged between the key 50A accommodated in the circumferential groove 25 and the key accommodating groove 355 and the access groove side surface 357*s* in the circumferential direction Dc. That is, the restraining member 60 restricts the approaching movement of the key 50A accommodated in the circumferential groove 25 and the key accommodating groove 355 toward the access groove side surface 357*s*.

The restraining member 60 of the present embodiment is formed in a rectangular parallelepiped block shape larger than the key 50A. The restraining member 60 has a shape that allows movement in the access groove 357 in the axial direction Da. By moving the restraining member 60 in the access groove 357 in the axial direction Da, the restraining member 60 can be inserted into the access groove 357 in a state where the key 50A is accommodated in the key accommodating groove 355. The restraining member 60 is formed so that the end portion 60*d* on the downstream side Dad in the axial direction Da of the restraining member 60 does not protrude from the disk surface 23*d*. In the present embodiment, the end portion 60*d* of the restraining member 60 is arranged at the same position as the disk surface 23*d* in the axial direction Da.

Further, as shown in FIG. 2, the restraining member 60 is restrained from moving in the axial direction Da in a state where the restraining member 60 is accommodated in the access groove 357 by a punching portion 100P formed on the disk surface 23*d*. The punching portion 100P is a region that is plastically deformed by being subjected to punching on the disk surface 23*d*. The punching portion 100P is recessed from the disk surface 23*d* to deform the outer peripheral surface 23*f* adjacent the access groove 357 when viewed from the axial direction Da. The punching portion 100P is formed at a position overlapping the circumferential groove 25 when viewed from the axial direction Da. The punching portion 100P is formed on the inner side Dri in the radial direction Dr with respect to the access groove 357 when viewed from the axial direction Da.

The punching portion 100P restrains the movement of the restraining member 60 in the axial direction Da and the circumferential direction Dc, and does not restrain the movement in the axial direction Da of the rotor blade 32 on which the flow pressure of the steam S flowing in the casing 10 acts. Therefore, a large pressure does not act on the punching portion 100P, and it is suppressed that the punching portion 100P is peeled off. Further, as long as the punching portion 100P is formed at a position where the movement of the restraining member 60 in the circumferential direction Dc can be restrained, the movement of the restraining member 60 in the axial direction Da may not be restrained.

By arranging the key 50A in the circumferential groove 25 and the key accommodating groove 355 in this way, the second rotor blade 32B is restrained from moving in the axial direction Da with respect to the disk portion 23. Further, by inserting the restraining member 60 between the key 50A and the access groove side surface 357*s*, the key 50A arranged in the circumferential groove 25 and the key accommodating groove 355 cannot move to the other side Dc2 in the circumferential direction Dc. As a result, the key 50A is prevented from coming out of the circumferential groove 25 and the key accommodating groove 355.

(Procedure in Method for Fixing Rotor Blade)

Figure 6:
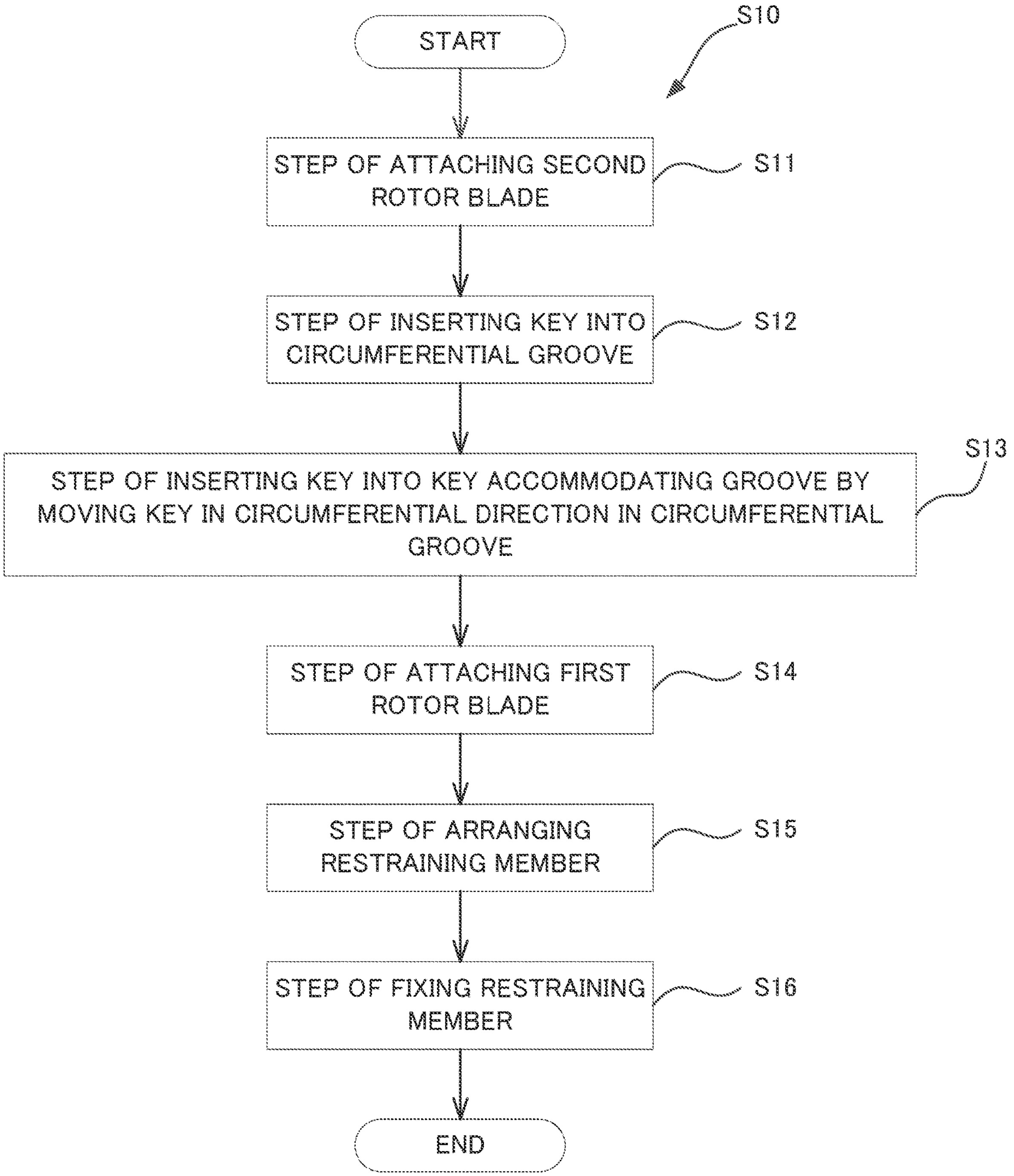
FIG. 6 is a flowchart showing a flow of a method for fixing a rotor blade according to the first embodiment of the present disclosure.

Next, a method S10 for fixing a rotor blade fixing the above-described rotor blade 32 to the disk portion 23 by the key 50A will be described. As shown in FIG. 6, the method S10 for fixing the rotor blade 32 according to the first embodiment includes a step S11 of attaching the second rotor blade 32B, a step S12 of inserting the key 50A into the circumferential groove 25, a step S13 of inserting the key 50A into the key accommodating groove 355, a step S14 of attaching the first rotor blade 32A, a step S15 of arranging the restraining member 60, and a step S16 of fixing the restraining member 60.

Figure 7:
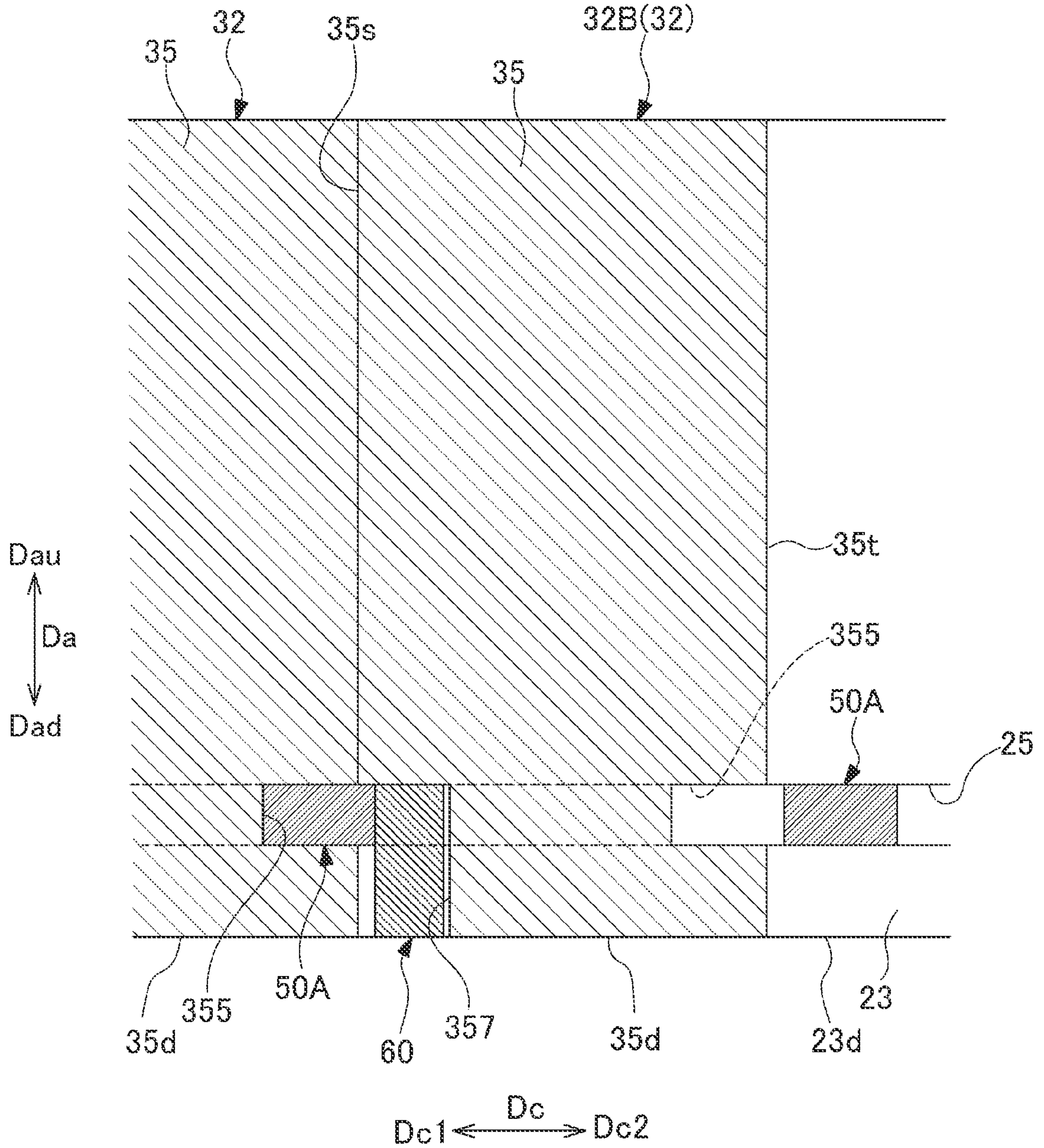
FIG. 7 is a view showing a step of inserting a key into a circumferential groove in the method for fixing a rotor blade according to the first embodiment of the present disclosure.

In the step S11 of attaching the second rotor blade 32B, one rotor blade 32 is attached to the disk portion 23 as the second rotor blade 32B. Specifically, as shown in FIG. 2, the blade root 36 is embedded in the blade embedding groove 28 of the disk portion 23. The blade root 36 is inserted into the blade embedding groove 28, for example, by moving the blade root 36 from the upstream side Dau in the axial direction Da to the downstream side Dad in the axial direction Da. As shown in FIG. 7, the second rotor blade 32B is moved until the first end surface 35*d* is located at the same position as the disk surface 23*d* in the axial direction Da.

In the step S12 of inserting the key 50A into the circumferential groove 25, the key 50A is inserted into the circumferential groove 25. In the step S12 of the present embodiment, one key 50A is attached to the disk portion 23 to which the second rotor blade 32B is attached. The key 50A is inserted into the circumferential groove 25 at a position shifted in the circumferential direction Dc with respect to the position where the second rotor blade 32B is arranged when viewed from the radial direction Dr. Specifically, the key 50A is arranged in the circumferential groove 25 at a position (in the present embodiment, a position where the first rotor blade 32A is arranged later) distant from the other side Dc2 in the circumferential direction Dc with respect to the second side surface 35*t* of the second rotor blade 32B so as not to overlap the second rotor blade 32B. By moving the key 50A from the outer side Dro toward the inner side Dri in the radial direction Dr, the region of the inner side Dri in the radial direction Dr in the key 50A is arranged in the circumferential groove 25.

Figure 8:
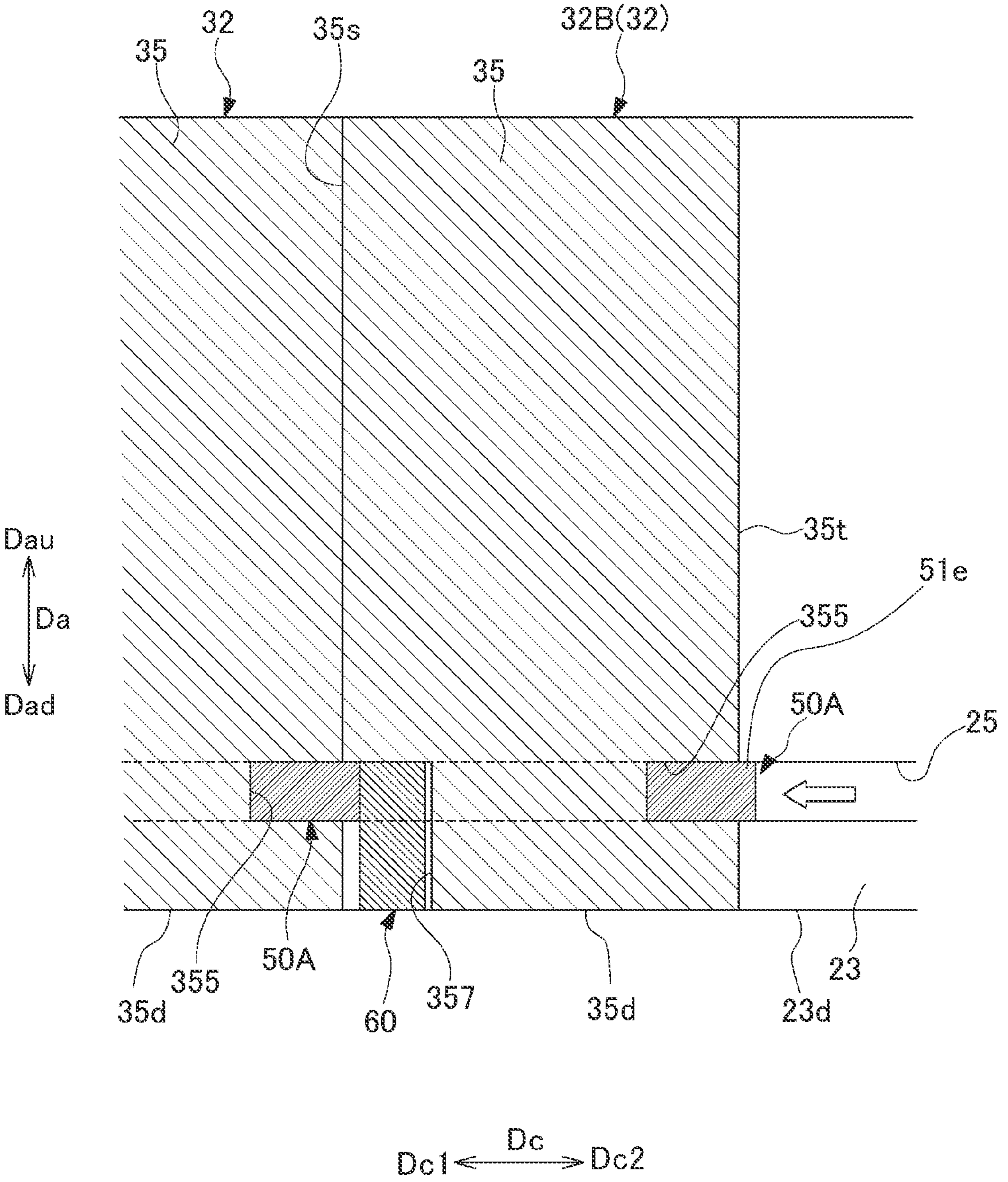
FIG. 8 is a view showing a step of inserting a key into a key accommodating groove in the method for fixing a rotor blade according to the first embodiment of the present disclosure.

In the step S13 of inserting the key 50A into the key accommodating groove 355, as shown in FIG. 8, the key 50A is moved in the circumferential direction Dc in the circumferential groove 25 and inserted into the key accommodating groove 355. Specifically, the key 50A is moved to one side Dc1 in the circumferential direction Dc in the circumferential groove 25. As a result, the key 50A is inserted into the key accommodating groove 355 opened at the second side surface 35*t* of the second rotor blade 32B from the position shifted in the circumferential direction Dc with respect to the position where the second rotor blade 32B is arranged. That is, the key 50A is moved to overlap the position where the second rotor blade 32B is arranged when viewed from the radial direction Dr. When the key 50A is inserted into the key accommodating groove 355, the key 50A is inserted into the key accommodating groove 355 and the circumferential groove 25 at the position overlapping the second rotor blade 32B. Further, in a state where the key 50A is accommodated in the key accommodating groove 355, the end portion 51*e* of the key 50A is arranged at a position protruding from the second side surface 35*t* to the other side Dc2 in the circumferential direction Dc. In this state, the region on the inner side Dr in the radial direction Dr in the key 50A is accommodated in the circumferential groove 25, and the region of the outer side Dro in the radial direction Dr in the key 50A is inserted in the key accommodating groove 355. As a result, the second rotor blade 32B is restrained from moving in the axial direction Da with respect to the disk portion 23 by the key 50A.

Figure 9:
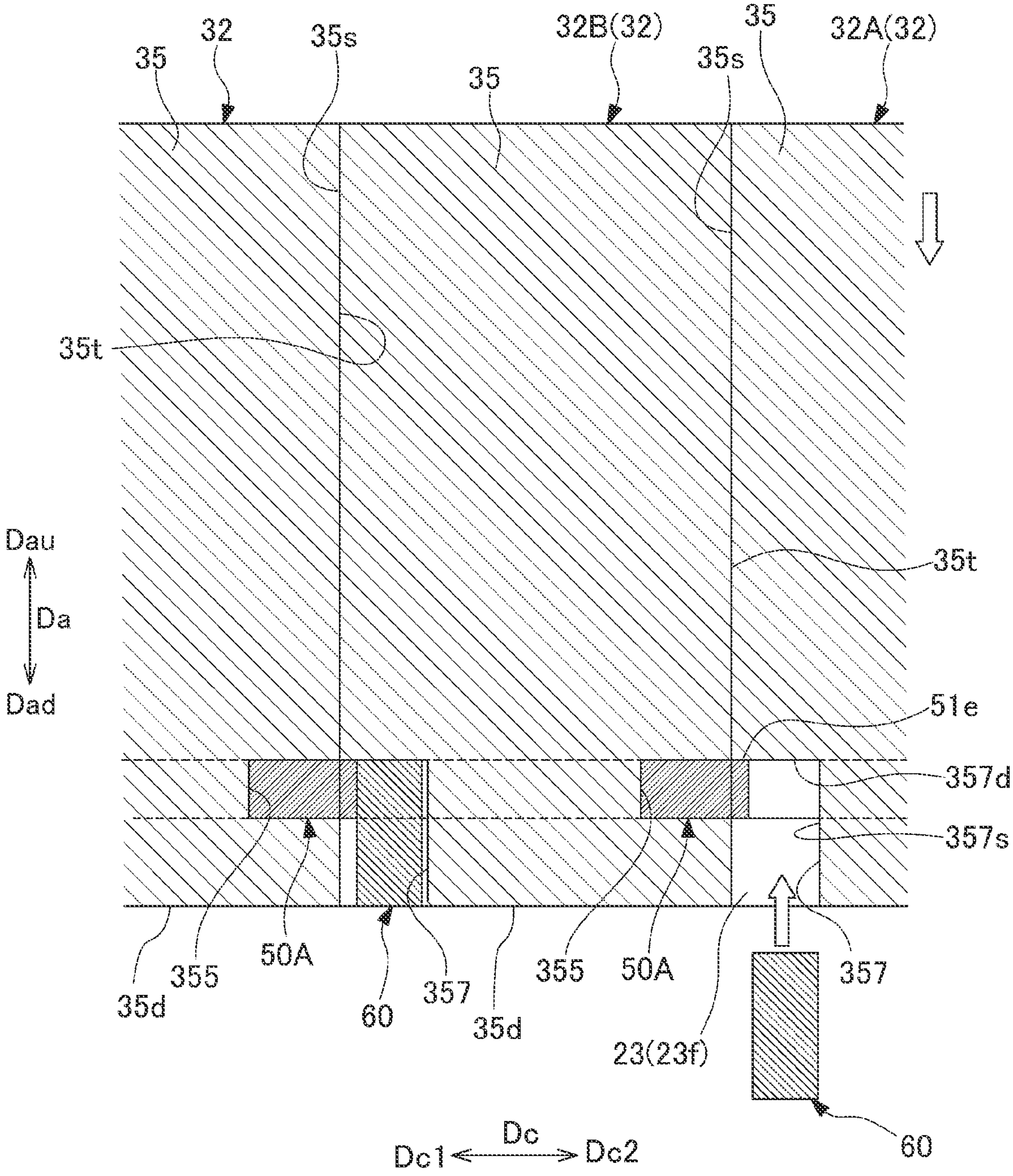
FIG. 9 is a view showing a step of attaching a first rotor blade and a step of arranging a restraining member in the method for fixing a rotor blade according to the first embodiment of the present disclosure.

In the step S14 of attaching the first rotor blade 32A, as shown in FIG. 9, one rotor blade 32 is attached to the disk portion 23 as the first rotor blade 32A. Specifically, the first rotor blade 32A is attached at a position adjacent to the second rotor blade 32B on the other side Dc2 in the circumferential direction Dc. In this case, the blade root 36 is embedded in the blade embedding groove 28 as in the step S11. When the blade root 36 is embedded in the blade embedding groove 28, the end portion 51*e* of the key 50A protrudes from the second side surface 35*t* of the second rotor blade 32B to the other side Dc2 in the circumferential direction Dc. Therefore, when the blade root 36 of the first rotor blade 32A is moved toward the downstream side Dad in the axial direction Da, the access groove end surface 357*d* of the access groove 357 of the first rotor blade 32A abuts on the end portion 51*e*. As a result, in the process of attaching the first rotor blade 32A, the movement of the first rotor blade 32A to the downstream side Dad in the axial direction Da is restrained.

The step S15 of arranging the restraining member 60 is performed after the first rotor blade 32A and the second rotor blade 32B are attached to the disk portion 23 and the key 50A is inserted into the key accommodating groove 355. In the step S15 of arranging the restraining member 60, the restraining member 60 is arranged in the access groove 357 of the first rotor blade 32A. Specifically, the restraining member 60 is inserted into the access groove 357 from the downstream side Dad in the axial direction Da. The restraining member 60 is inserted to a position where the restraining member 60 comes into contact with the access groove end surface 357*d*. As a result, the restraining member 60 is inserted between the key 50A and the access groove side surface 357*s*. As a result, the movement of the key 50A approaching the access groove side surface 357*s* in the circumferential direction Dc is restrained.

In the step S16 of fixing the restraining member 60, the restraining member 60 arranged in the access groove 357 is fixed. In the present embodiment, the movement of the restraining member 60 arranged in the access groove 357 in the axial direction Da and the circumferential direction Dc is restrained, and thus, the position of the restraining member 60 is fixed. Specifically, as shown in FIG. 2, the punching portion 100P is formed by punching the disk surface 23*d*. The punching portion 100P is recessed from the disk surface 23*d* to deform the outer peripheral surface 23*f* adjacent the access groove 357 when viewed from the axial direction Da. Due to the punching portion 100P, the outer peripheral surface 23*f* facing the access groove 357 is plastically deformed to slightly protrude to the outer side Dro in the radial direction Dr when viewed from the axial direction Da. As a result, the protruding portion of the punching portion 100P abuts on the restraining member 60. As a result, the movement of the restraining member 60 in the axial direction Da is restrained. In this way, the attachment to the disk portion 23 of the first rotor blade 32A and the second rotor blade 32B is completed.

After that, the rotor blade 32 attached to the disk portion 23 as the first rotor blade 32A is handled as a new second rotor blade 32B, and the step S12 and subsequent steps of inserting the above-mentioned key 50A into the circumferential groove 25 are performed. In the step S12, a new key 50A is inserted into the circumferential groove 25 with respect to the second side surface 35*t* of the new second rotor blade 32B. After that, the steps S13 to S16 are sequentially executed in the same manner as described above. In this way, by sequentially attaching the first rotor blades 32A adjacent to the second rotor blades 32B in the circumferential direction Dc, all the rotor blades 32 of one rotor blade row 31 are attached to the disk portion 23. By performing this at the positions of the other rotor blade rows 31, the rotor 20 of the steam turbine 1 is manufactured.

(Action Effect)

In the rotor 20 of the steam turbine 1 having the above configuration, the steam turbine 1, and the method S10 for fixing the rotor blade 32, the rotor blade 32 (second rotor blade 32B) is fixed in a state of being immovable in the axial direction Da with respect to the disk portion 23 by the key 50A arranged in the circumferential groove 25 and the key accommodating groove 355. The key 50A is moved to one side Dc1 in the circumferential direction Dc in the circumferential groove 25 with respect to the second rotor blade 32B in which the blade root 36 is inserted into the blade embedding groove 28, and thus, the key 50A is also inserted into the key accommodating groove 355. Accordingly, the key 50A is arranged in the circumferential groove 25 and the key accommodating groove 355 of the second rotor blade 32B from the position shifted with respect to the second rotor blade 32B. As a result, the second rotor blade 32B cannot move in the axial direction Da with respect to the key 50A accommodated in the circumferential groove 25. Therefore, simply by moving the key 50A in the circumferential groove 25 and arranging the key 50A in the circumferential groove 25 and the key accommodating groove 355, the second rotor blade 32B can be reliably fixed in a state of being immovable with respect to the disk portion 23. In this way, the rotor blade 32 can be easily and reliably restrained by the key 50A.

Further, the circumferential groove 25 extends in the circumferential direction Dc from the position overlapping the platform 35 of the second rotor blade 32B to the position overlapping the platform 35 of the first rotor blade 32A. As a result, even after the blade root 36 of the second rotor blade 32B is embedded in the blade embedding groove 28, the key 50A can be inserted into the circumferential groove 25 at the position where the first rotor blade 32A shifted in the circumferential direction Dc with respect to the second rotor blade 32B is arranged. After that, the key 50A is simply moved in the circumferential groove 25 to one side Dc1 of the circumferential direction Dc, and is inserted into the key accommodating groove 355 of the second rotor blade 32B without interfering with the second rotor blade 32B. Therefore, the second rotor blade 32B can be fixed to the disk portion 23 by the key 50A regardless of the order in which the second rotor blade 32B and the key 50A are attached.

Further, the restraining member 60 for restraining the movement of the key 50A approaching the access groove side surface 357*s* in the circumferential direction Dc is arranged in the access groove 357. As a result, by inserting the restraining member 60 between the key 50A and the access groove side surface 357*s*, the key 50A arranged in the circumferential groove 25 and the key accommodating groove 355 is restrained from moving to the other side Dc2 in the circumferential direction Dc. Therefore, it is possible to prevent the key 50A from coming out of the circumferential groove 25 and the key accommodating groove 355. As a result, the key 50A can be prevented from coming off from the circumferential groove 25, and the state where the movement of the second rotor blade 32B in the axial direction Da can be restrained can be stably maintained. Further, the restraining member 60 is arranged between the key 50A and the access groove side surface 357*s* in the access groove 357. Therefore, even when the plurality of rotor blades 32 (first rotor blade 32A and second rotor blade 32B) and the key 50A is attached to the disk portion 23, the restraining member 60 can be accessed through the access groove 357. That is, even when the first rotor blade 32A and the second rotor blade 32B are fixed to the disk portion 23, the restraining member 60 can be attached or detached. Therefore, by attaching/detaching the restraining member 60 to/from the access groove 357, the fixing of the second rotor blade 32B by the key 50A can be easily released.

Further, the outer peripheral surface 23*f* is deformed by the punching portion 100P and the shape of the circumferential groove 25 is changed, so that the movement of the restraining member 60 in the axial direction Da and the circumferential direction Dc is restrained. As a result, it is possible to prevent the restraining member 60 from naturally falling out of the access groove 357 due to vibration or the like during operation of the steam turbine 1. Therefore, the state where the movement of the second rotor blade 32B in the axial direction Da by the key 50A is restrained can be maintained more stably.

Further, with respect to the second rotor blade 32B, the end portion 51*e* of the key 50A protrudes to the other side Dc2 in the circumferential direction Dc. Therefore, when the blade root 36 of the first rotor blade 32A is moved toward the downstream side Dad in the axial direction side Da, the access groove end surface 357*d* of the first rotor blade 32A abuts on the end portion 51*e*. As a result, in the process of attaching the first rotor blade 32A, the movement of the first rotor blade 32A to the downstream side Dad in the axial direction Da is restrained. Therefore, when the first rotor blade 32A is attached, it is possible to prevent the disk portion 23 from going too far to the downstream side Dad in the axial direction Da. Therefore, positioning of the first rotor blade 32A in the axial direction Da with respect to the disk portion 23 can be easily and accurately performed.

Further, by fixing the rotor blade 32 to the disk portion 23 using the key 50A, the rotor blade 32 can be easily and reliably restrained by the key 50A at the time of assembling the steam turbine 1, the maintenance of the rotor 20, and the like. Further, the rotor blade 32 can be easily detached from the disk portion 23 simply by moving the key 50A.

Modification Example of First Embodiment

The structure of the restraining member 60 is not limited to the structure of the first embodiment. The restraining member 60 may have a structure capable of restraining the movement of the key 50A. As a modification example of the restraining member 60, for example, the following configuration is also possible.

Figure 10:
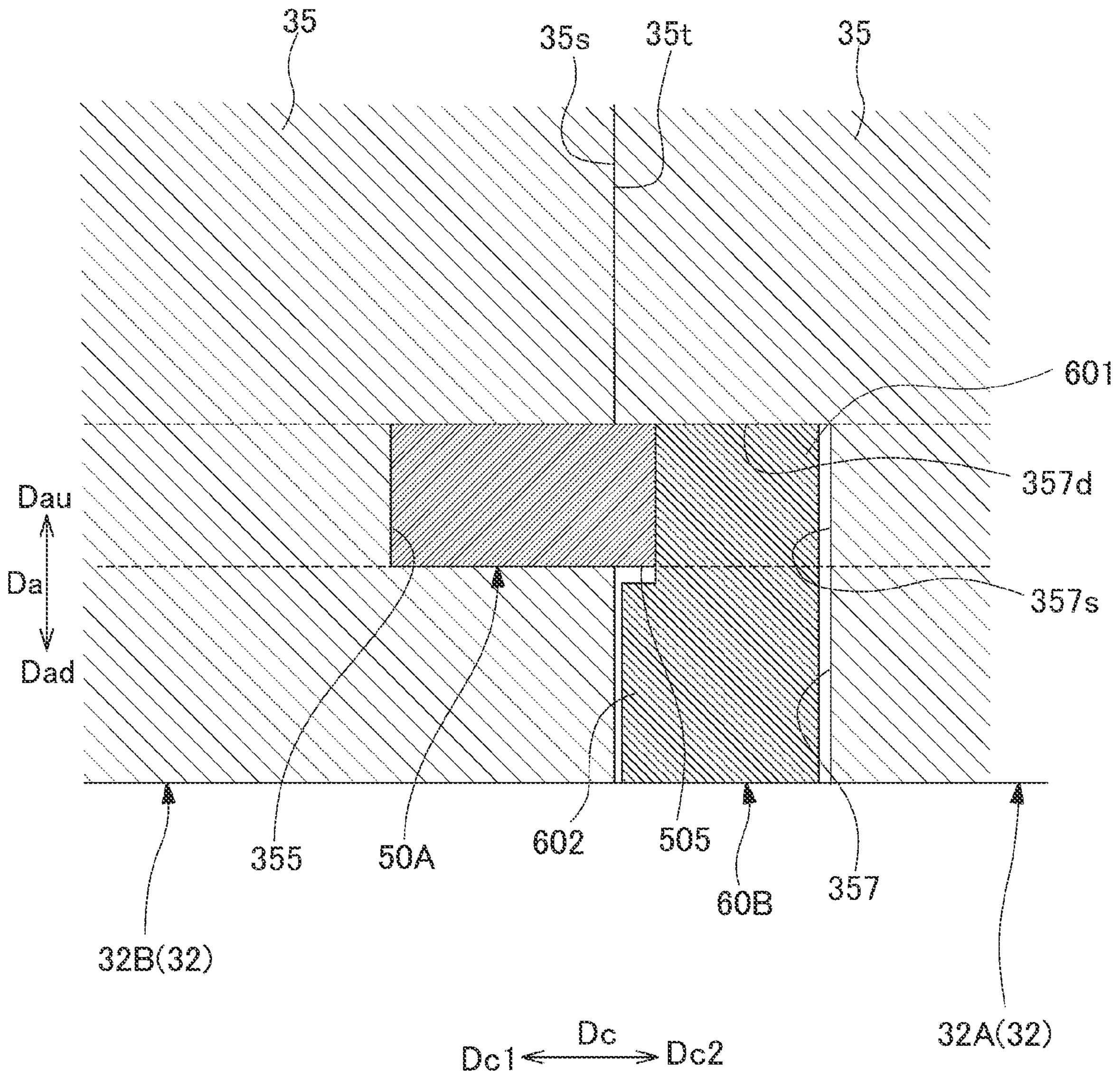
FIG. 10 is a view schematically showing a fixed structure of a rotor blade according to a modification example of the first embodiment of the present disclosure.

As shown in FIG. 10, a restraining member 60B is inserted between the key 50A and the access groove side surface 357*s*, similarly to the restraining member 60 in the first embodiment. When viewed from the radial direction Dr, the restraining member 60B protrudes from the key 50A to the downstream side Dad in the axial direction Da in the access groove 357. The restraining member 60B has an insertion portion 601 and a protrusion portion (rotation restriction portion) 602. The insertion portion 601 is arranged between the key 50A and the access groove side surface 357*s* in the axial direction Da. The protrusion portion 602 restricts the rotation of the insertion portion 601 when viewed from the radial direction Dr in the access groove 357. Specifically, the protrusion portion 602 is arranged at a position close to the first end surface 35*d* in the axial direction Da with respect to the insertion portion 601. The protrusion portion 602 is integrally formed with the insertion portion 601. The protrusion portion 602 protrudes to one side Dc1 in the circumferential direction Dc at a position shifted to the downstream side Dad in the axial direction Da with respect to the key 50A when viewed from the radial direction Dr. The protrusion portion 602 protrudes to overlap when the key 50A is arranged in the circumferential direction Dc. The protrusion portion 602 is arranged in the access groove 357 at a position facing a key end surface 505 of the key 50A. The key end surface 505 is a plane facing the downstream side Dad in the axial direction Da in the key 50A.

In the restraining member 60B of the modification example, the protrusion portion 602 abuts on the key end surface 505. Therefore, the restraining member 60B is prevented from rotating about a virtual axis extending in the radial direction Dr when viewed from the radial direction Dr in the access groove 357. As a result, it is possible to more stably maintain the state where the key 50A by the insertion portion 601 is restrained from moving to the other side Dc2 in the circumferential direction Dc.

Second Embodiment

Next, a second embodiment of a rotor of a steam turbine, a steam turbine, and a method for fixing a rotor blade according to the present disclosure will be described. In the second embodiment described below, the same reference numerals are given in the drawings to the configurations common to the first embodiment, and descriptions thereof will be omitted. The second embodiment is different from the first embodiment in that the restraining member 60 is not provided and a key 50B is used.

Figure 11:
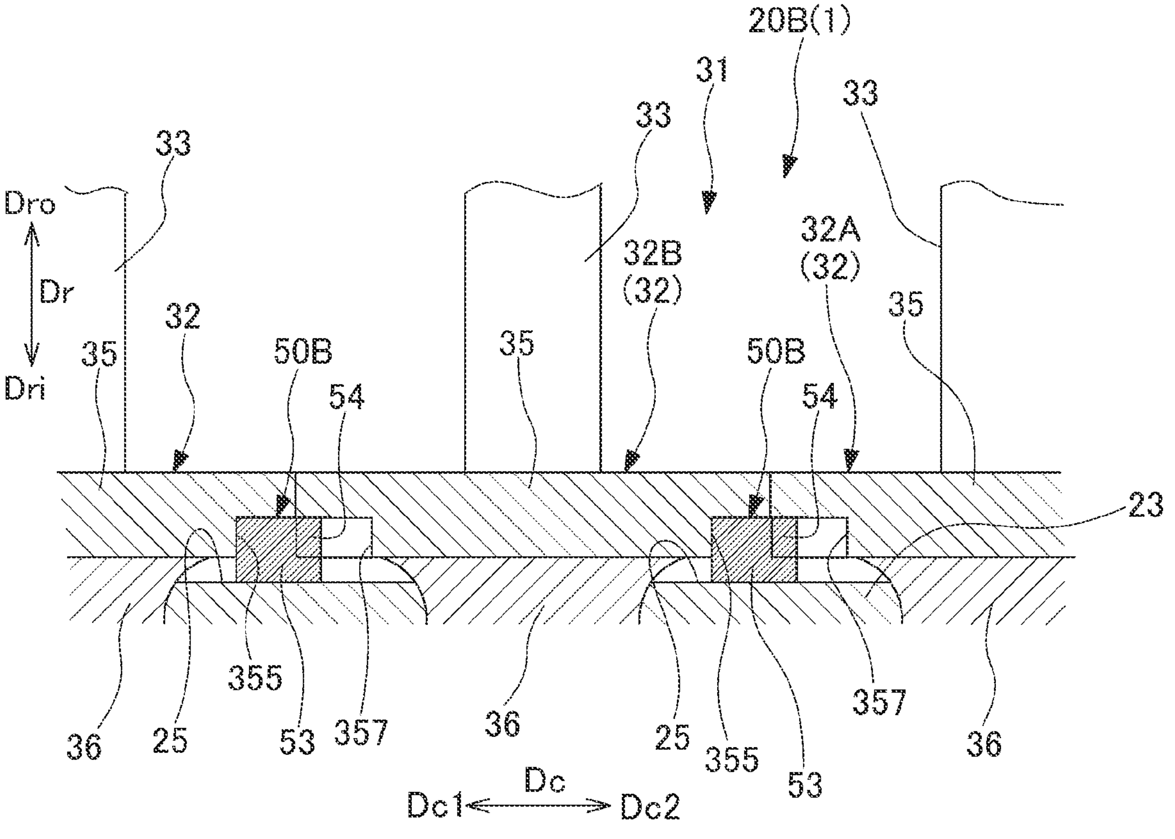
FIG. 11 is a cross-sectional view schematically showing a fixed structure of a rotor blade according to a second embodiment of the present disclosure, as viewed from an axial direction.
Figure 12:
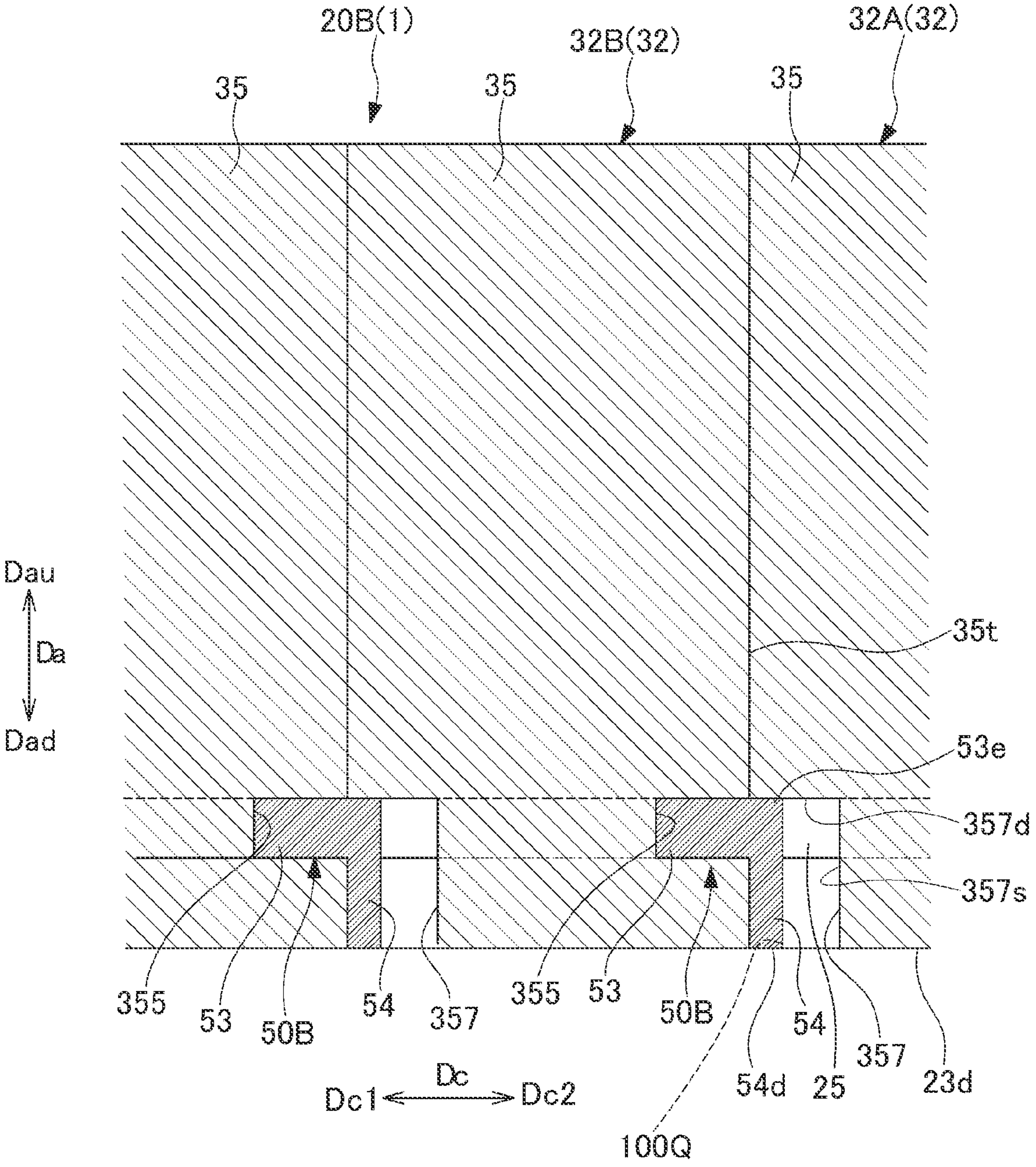
FIG. 12 is a cross-sectional view schematically showing the fixed structure of a rotor blade according to the second embodiment of the present disclosure, as viewed from a radial direction.
Figure 13:
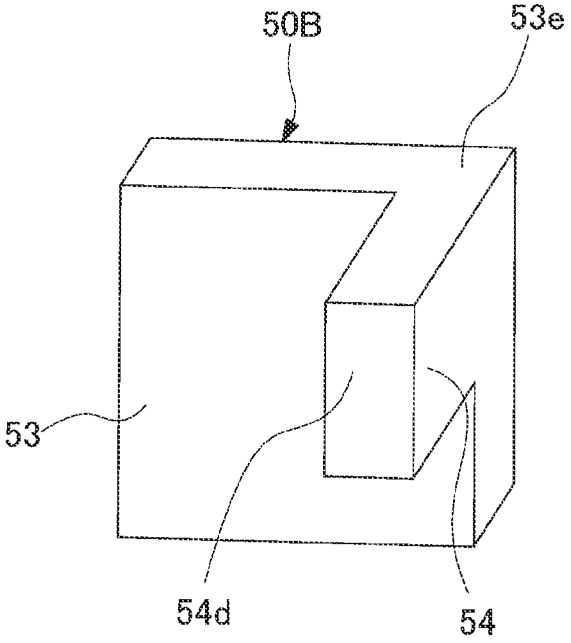
FIG. 13 is a perspective view showing a key configuration of the fixed structure of a rotor blade according to the second embodiment of the present disclosure.

As shown in FIGS. 11 and 12, in a rotor 20B of the steam turbine 1 of the present embodiment, the rotor blades 32 are restrained from moving in the axial direction Da with respect to the disk portion 23 by the key 50B. The key 50B is arranged inside the circumferential groove 25 and the key accommodating groove 355. As shown in FIGS. 11 to 13, the key 50B of the second embodiment integrally has a key body portion 53 and a key extension portion 54.

The key body portion 53 is inserted into the key accommodating groove 355, the circumferential groove 25, and the access groove 357. The key body portion 53 is formed, for example, in the shape of a rectangular parallelepiped block shape. The key body portion 53 has a shape that allows movement in the circumferential groove 25 in the circumferential direction Dc. The key body portion 53 can move between the key accommodating groove 355 and the access groove 357 by moving in the circumferential groove 25 in the circumferential direction Dc. The key body portion 53 has the same length in the axial direction Da as the circumferential groove 25 and the key accommodating groove 355 to be in sliding contact with the circumferential groove 25 and the key accommodating groove 355. The region including the end portion 53*e* on the other side Dc2 in the circumferential direction Dc, which is a part of the key body portion 53, protrudes from the second side surface 35*t* to the other side Dc2 in the circumferential direction Dc in a state where the key body portion 53 is accommodated in the circumferential groove 25 and the key accommodating groove 355. Even when the key body portion 53 is accommodated in the circumferential groove 25 and the key accommodating groove 355, a part of the region including the end portion 53*e* is arranged in the access groove 357.

The key extension portion 54 extends from the end portion 53*e* of the key body portion 53 to the downstream side Dad in the axial direction Da. When viewed from the axial direction Da, the key extension portion 54 is arranged at a position on the outer side Dro in the radial direction Dr with respect to the circumferential groove 25, in a state where the key body portion 53 is accommodated in the circumferential groove 25 and the key accommodating groove 355. The key extension portion 54 is arranged in the access groove 357 when viewed from the axial direction Da. In the key extension portion 54, the end portion 54*d* of the downstream side Dad in the axial direction Da extends to the same position as the disk surface 23*d* in the axial direction Da. A punching portion 100Q is formed in the disk surface 23*d* on the inner side Dri in the radial direction Dr with respect to the end portion 54*d* of the key extension portion 54. By forming the punching portion 100Q, the portion of the inner side Dri in the radial direction Dr of the end portion 54*d* is plastically deformed in the disk surface 23*d*, and the movement of the key extension portion 54 in the axial direction Da and the circumferential direction Dc is restrained.

As long as the punching portion 100Q of the second embodiment is formed at a position where the movement of the key 50B in the circumferential direction Dc can be restrained, the movement of the key 50B in the axial direction Da may not be restrained.

(Procedure in Method for Fixing Rotor Blade)

Figure 14:
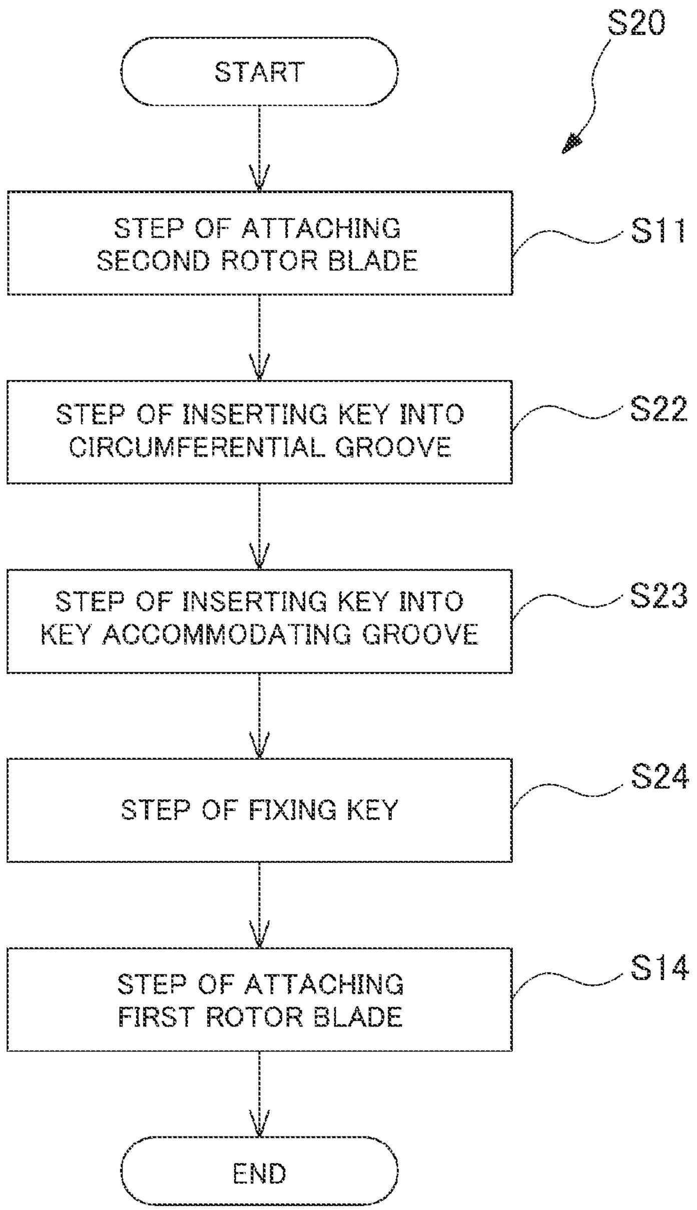
FIG. 14 is a flowchart showing a flow of a method for fixing a rotor blade according to the second embodiment of the present disclosure.

Next, a method S20 for fixing a rotor blade according to a second embodiment for fixing the above-described rotor blade 32 to the disk portion 23 by the key 50B will be described. The method S20 for fixing the rotor blade 32 according to the second embodiment is different from the method S10 for fixing the rotor blade 32 according to the first embodiment, does not include the step S15 of arranging the restraining member 60 and the step S16 of fixing the restraining member 60, and includes a step S24 of fixing the key 50B. Specifically, as shown in FIG. 14, the method S20 for fixing the rotor blade 32 according to the second embodiment includes the step S11 of attaching the second rotor blade 32B, a step S22 of inserting the key 50B into the circumferential groove 25, a step S23 of inserting the key 50B into the key accommodating groove 355, the step S24 of fixing the key 50B, and the step S15 of attaching the first rotor blade 32A.

Figure 15:
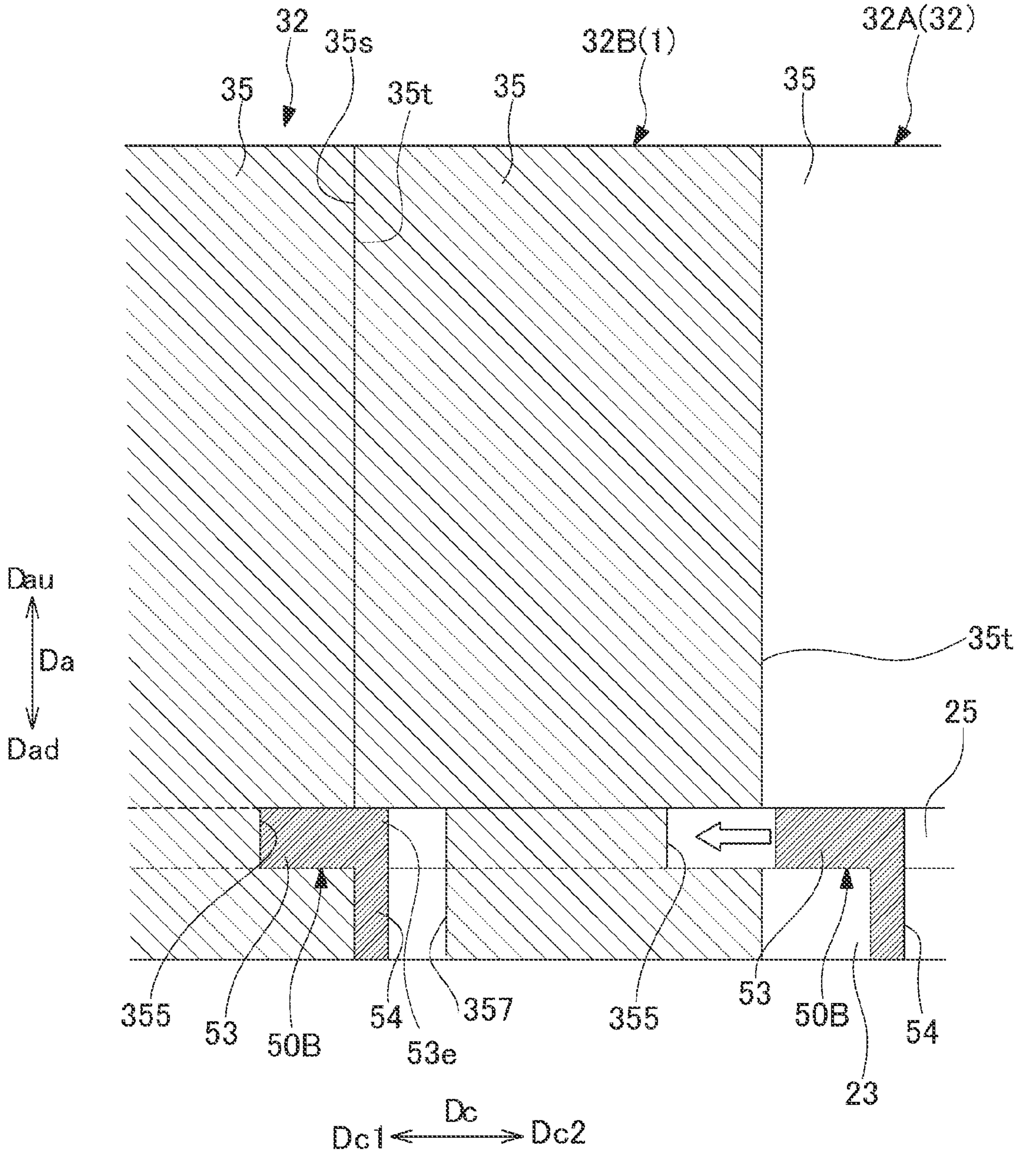
FIG. 15 is a view showing a step of inserting a key into a circumferential groove and a step of inserting a key into a key accommodating groove in the method for fixing a rotor blade according to the second embodiment of the present disclosure.

The step S11 of attaching the second rotor blade 32B is performed in the same manner as in the first embodiment. After that, in the step S22 of inserting the key 50B into the circumferential groove 25, as shown in FIG. 15, the key body portion 53 of the key 50B is inserted into the circumferential groove 25. In the step S22 of the present embodiment, one key 50B is attached to the disk portion 23 to which the second rotor blade 32B is attached. The key body portion 53 is inserted into the circumferential groove 25 at a position shifted from the position where the second rotor blade 32B is arranged in the circumferential direction Dc when viewed from the radial direction Dr. By moving the key body portion 53 from the outer side Dro toward the inner side Dri in the radial direction Dr, the region on the inner side Dri in the radial direction Dr in the key body portion 53 is arranged in the circumferential groove 25.

In the step S23 of inserting the key 50B into the key accommodating groove 355, the key 50B is moved in the circumferential direction Dc in the circumferential groove 25, and the key body portion 53 is inserted into the key accommodating groove 355. The key body portion 53 is inserted into the key accommodating groove 355 opened at the second side surface 35*t* of the second rotor blade 32B from a position shifted in the circumferential direction Dc with respect to the position where the second rotor blade 32B is arranged. Further, as shown in FIG. 12, in a state where the key body portion 53 is accommodated in the key accommodating groove 355, the end portion 53*e* of the key body portion 53 is arranged at a position protruding from the second side surface 35*t* to the other side Dc2 in the circumferential direction Dc. Further, the key extension portion 54 extending from the end portion 53*e* is arranged in the access groove 357. In this state, the region on the inner side Dri in the radial direction Dr in the key body portion 53 is accommodated in the circumferential groove 25, and the region of the outer side Dro in the radial direction Dr in the key body portion 53 is inserted into the key accommodating groove 355. As a result, the second rotor blade 32B is restrained from moving in the axial direction Da with respect to the disk portion 23 by the key body portion 53.

After that, the step S14 of attaching the first rotor blade 32A is performed in the same manner as in the first embodiment. When the blade root 36 of the first rotor blade 32A is moved toward the downstream side Dad in the axial direction Da, the access groove end surface 357*d* of the access groove 357 of the first rotor blade 32A abuts on the end portion 53*e*. As a result, in the process of attaching the first rotor blade 32A, the movement of the first rotor blade 32A to the downstream side Dad in the axial direction Da is restrained. Further, in a state where the key body portion 53 is accommodated in the key accommodating groove 355, the key extension portion 54 extends from the end portion 53*e* of the key body portion 53 to the downstream side Dad in the axial direction Da in the access groove 357.

In the step S25 of fixing the key 50B, the moved key 50B in which the key body portion 53 is accommodated is fixed in the key accommodating groove 355. In the present embodiment, the position of the key 50B is fixed by restraining the movement of the axial direction Da and the circumferential direction Dc of the key extension portion 54 arranged in the access groove 357. Specifically, in the disk surface 23*d*, punching is performed on the portion on the inner side Dri in the radial direction Dr of the key extension portion 54. As a result, the punching portion 100Q is formed. The punching portion 100Q is recessed from the disk surface 23*d* to deform the outer peripheral surface 23*f* adjacent the access groove 357 when viewed from the axial direction Da. Due to the punching portion 100Q, the outer peripheral surface 23*f* close to the key extension portion 54 is plastically deformed to protrude to the outer side Dro in the radial direction Dr. As a result, the protruding portion of the punching portion 100Q abuts on the key extension portion 54. Accordingly, the movement of the key 50B in the axial direction Da and the circumferential direction Dc is restrained. As a result, the attachment of the first rotor blade 32A and the second rotor blade 32B to the disk portion 23 is completed.

After that, as in the first embodiment, each step is repeatedly performed, and thus, all the rotor blades 32 of one rotor blade row 31 are attached to the disk portion 23.

The step S23 of inserting the key 50B into the key accommodating groove 355 may be performed after the step S14 of attaching the first rotor blade 32A. In that case, by moving the key extension portion 54, the key body portion 53 is inserted into the key accommodating groove 355.

(Action Effect)

In the second embodiment, the second rotor blade 32B is fixed in a state of being immovable in the axial direction Da with respect to the disk portion 23 by the key body portion 53 arranged in the circumferential groove 25 and the key accommodating groove 355. The key body portion 53 is moved to one side Dc1 in the circumferential direction Dc in the circumferential groove 25 with respect to the second rotor blade 32B in which the blade root 36 is inserted into the blade embedding groove 28, and thus, the key body portion 53 is also inserted into the key accommodating groove 355. Thereby, the rotor blade 32 can be easily and reliably restrained by the key 50B.

Further, the outer peripheral surface 23*f* is deformed by the punching portion 100Q and the shape of the circumferential groove 25 is changed, so that the movement of the key extension portion 54 extending from the key body portion 53 in the axial direction Da and the circumferential direction Dc is restrained. Therefore, the movement of the key body portion 53 in the axial direction Da and the circumferential direction Dc is also restrained. As a result, it is possible to prevent the key body portion 53 from moving to come out from the inside of the key accommodating groove 355 to the other side Dc2 in the circumferential direction Dc due to vibration or the like during the operation of the steam turbine 1. As a result, the state where the movement of the second rotor blade 32B in the axial direction Da is restrained by the key 50B can be maintained more stably without using a member other than the key 50B such as the restraining member 60.

Further, the key extension portion 54 extends from the key body portion 53 in the access groove 357 in the axial direction Da. Therefore, the key body portion 53 in the circumferential groove 25 can be easily moved to the circumferential direction Dc through the key extension portion 54 in the access groove 357. That is, even when the first rotor blade 32A and the second rotor blade 32B are fixed to the disk portion 23, the key body portion 53 can be inserted or removed from the key accommodating groove 355. Therefore, by moving the key extension portion 54, the fixing of the second rotor blade 32B by the key 50B can be easily released.

Third Embodiment

Next, a third embodiment of a rotor of a steam turbine, a steam turbine, and a method for fixing a rotor blade according to the present disclosure will be described. In the third embodiment described below, the same reference numerals are given in the drawings to the configurations common to the first embodiment and the second embodiment, and descriptions thereof will be omitted. The third embodiment is different from the first embodiment in that the restraining member 60 is not provided and a key 50C is used.

Figure 16:
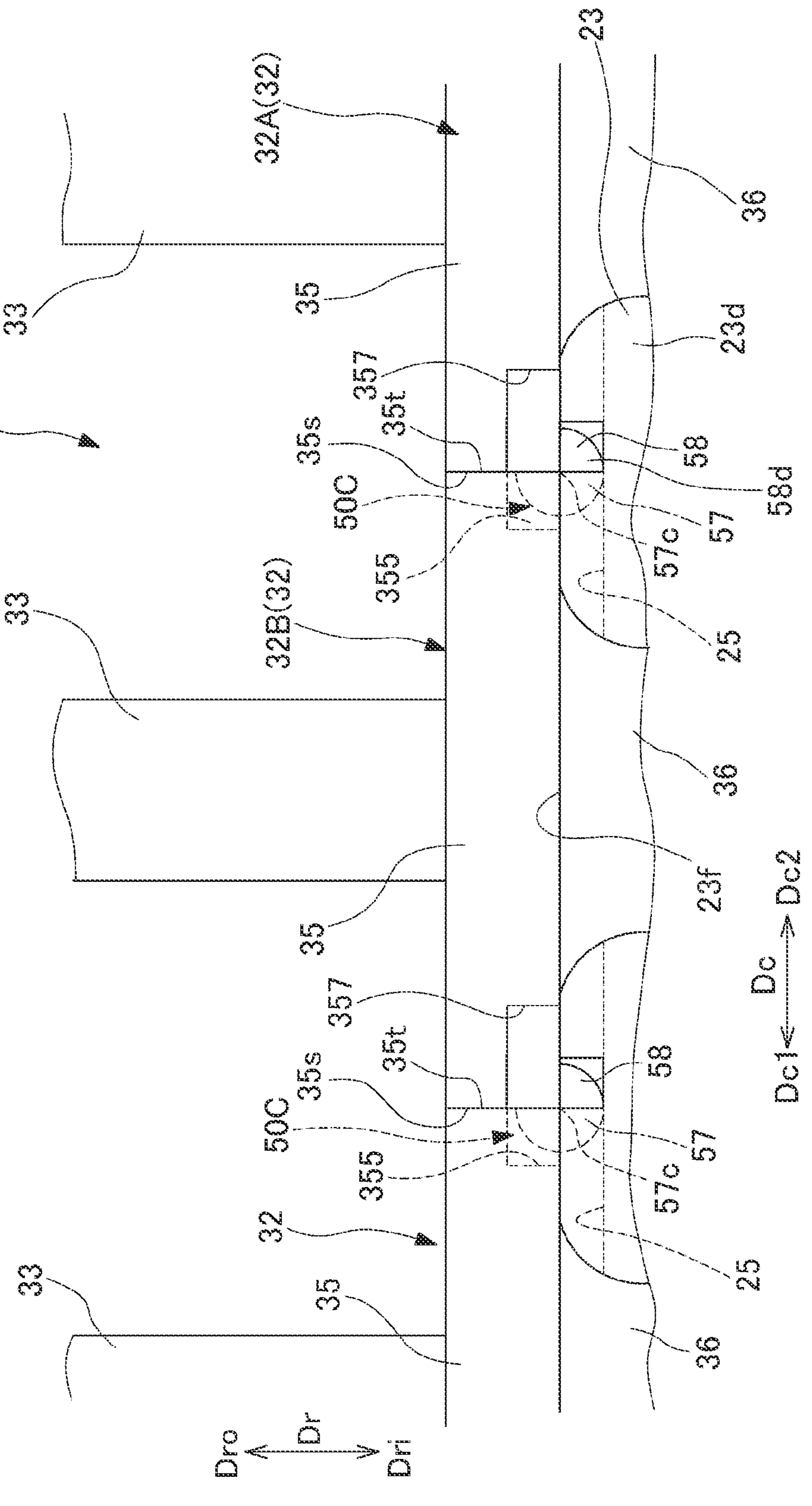
FIG. 16 is a cross-sectional view schematically showing a fixed structure of a rotor blade according to a third embodiment of the present disclosure, as viewed from an axial direction.
Figure 17:
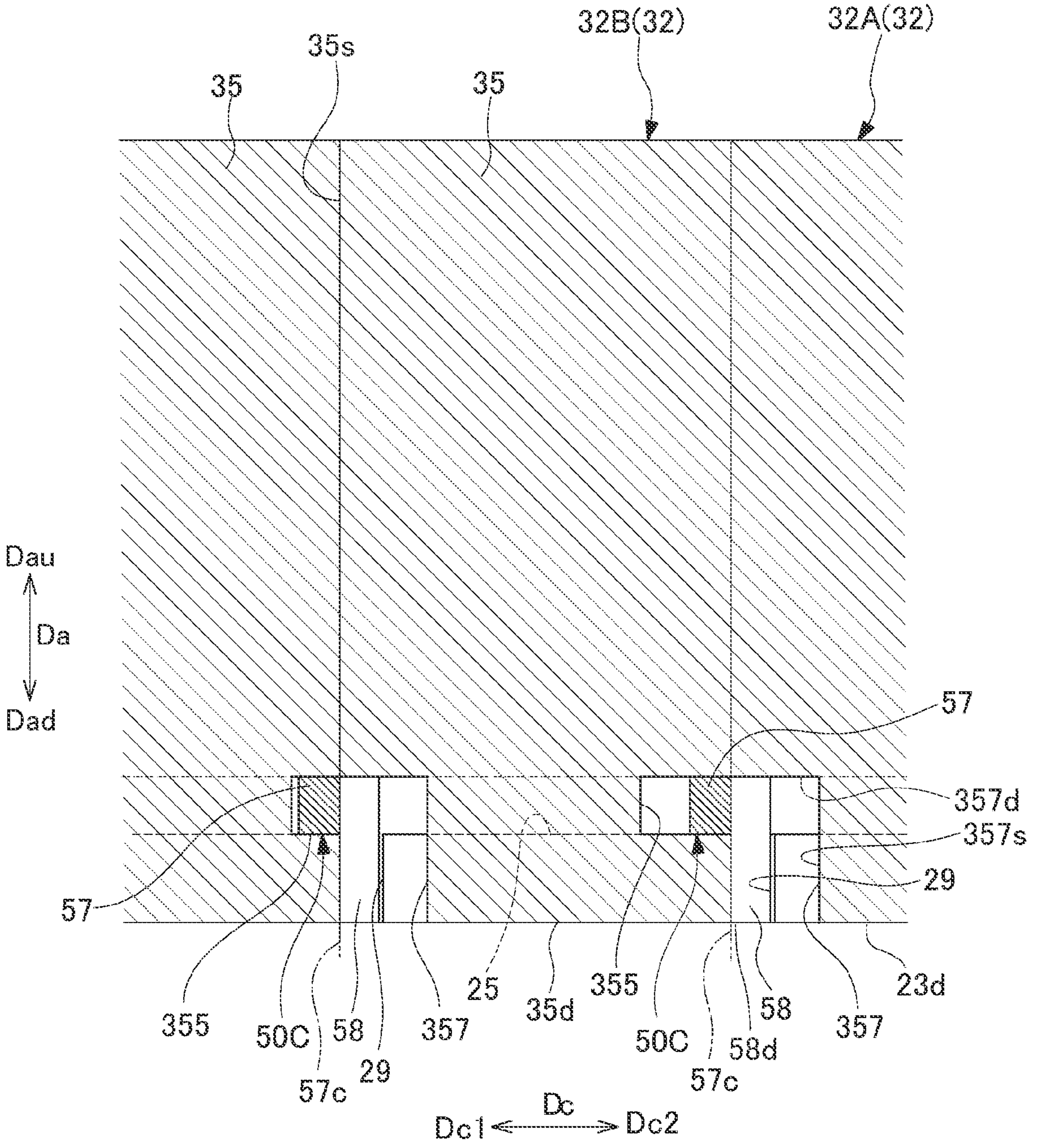
FIG. 17 is a cross-sectional view schematically showing the fixed structure of a rotor blade according to the third embodiment of the present disclosure, as viewed from a radial direction.
Figure 18:
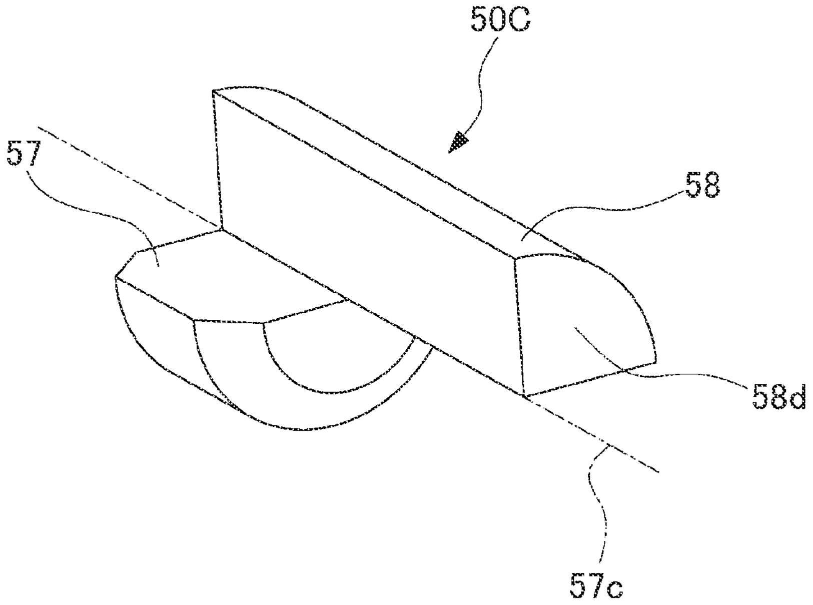
FIG. 18 is a perspective view showing a key configuration of the fixed structure of a rotor blade according to a third embodiment of the present disclosure.

As shown in FIGS. 16 to 18, in a rotor 20C of the steam turbine 1 of the present embodiment, the rotor blades 32 are restrained from moving in the axial direction Da with respect to the disk portion 23 by the key 50C. The key 50C of the third embodiment integrally has a key main portion 57 and a key stopper portion 58.

The key main portion 57 is inserted into the circumferential groove 25 and the key accommodating groove 355. The key main portion 57 is formed in a semicircular shape, for example, when viewed from the axial direction Da. The key main portion 57 is rotatable around a central axis 57*c* extending in the axial direction Da in the circumferential groove 25 and the key accommodating groove 355. The key main portion 57 is movable between the key accommodating groove 355 and the access groove 357 by rotating in the circumferential groove 25. The key main portion 57 has the same length in the axial direction Da as the circumferential groove 25 and the key accommodating groove 355 to be in sliding contact with the circumferential groove 25 and the key accommodating groove 355. Further, it is preferable that an outer peripheral portion of the key main portion 57 is chamfered or has a curved surface shape. The key main portion 57 may have a circular shape when viewed from the axial direction Da.

The key stopper portion 58 restrains the movement of the key main portion 57 approaching the access groove side surface 357*s* in the circumferential direction Dc. The key stopper portion 58 extends from the key main portion 57 to the downstream side Dad in the axial direction Da. The key stopper portion 58 is formed in a columnar shape having a ¼ circular (quarter circle) cross-sectional shape when viewed from the axial direction Da, for example. The key stopper portion 58 is integrally formed with the key main portion 57 to be attached to a plane portion forming a diameter of the key main portion 57 having a semicircular plate shape when viewed from the axial direction Da.

The disk portion 23 is formed with an axial groove 29 in which the key stopper portion 58 is accommodated. The axial groove 29 is recessed from the outer peripheral surface 23*f* to the inner side Dri in the radial direction Dr and extends in the axial direction Da. The axial groove 29 is formed to open at the disk surface 23*d*. The axial groove 29 communicates with the circumferential groove 25 in the axial direction Da. The axial groove 29 is formed at a position where the axial groove 29 can communicate with the access groove 357 in the radial direction Dr.

The key stopper portion 58 is arranged in the axial groove 29 in a state where the key main portion 57 is accommodated in the circumferential groove 25 and the key accommodating groove 355. In the state where the key main portion 57 is accommodated in the circumferential groove 25 and the key accommodating groove 355, an end portion 58*d* on the downstream side Dad in the axial direction Da of the key stopper portion 58 is arranged at the same position as that of the disk surface 23*d* in the axial direction Da.

In the third embodiment, it is not essential to form the punching portion for restraining the movement of the key 50C in the disk surface 23*d*. When the punching portion is formed, the punching portion may be formed on the end portion 58*d* of the key stopper portion 58 and the disk surface 23*d* at a position adjacent to each other in the circumferential direction Dc.

(Procedure in Method for Fixing Rotor Blade)

Figure 19:
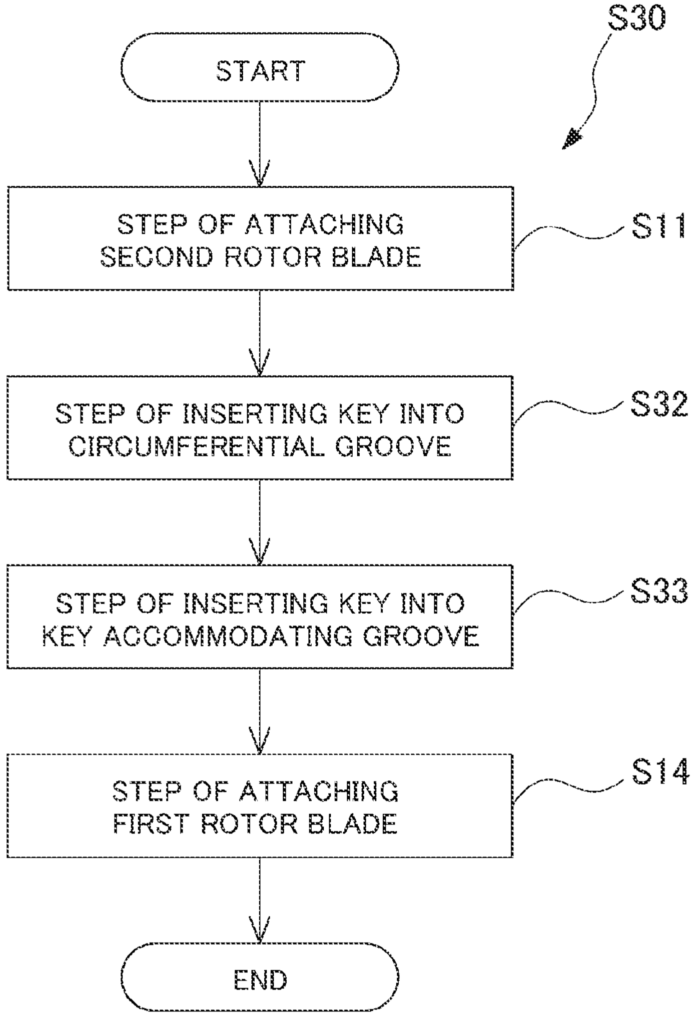
FIG. 19 is a flowchart showing a flow of a method for fixing a rotor blade according to a third embodiment of the present disclosure.

Next, a method S30 for fixing a rotor blade according to a third embodiment for fixing the above-described rotor blade 32 to the disk portion 23 by the key 50C will be described. The method S30 for fixing the rotor blade 32 according to the third embodiment is different from that of the second embodiment in the arrangement and fixing method of the key 50C. As shown in FIG. 19, the method S30 for fixing the rotor blade 32 according to the embodiment of the present disclosure includes the step S11 of attaching the second rotor blade 32B, a step S32 of inserting the key 50C into the circumferential groove 25, a step S33 of inserting the key 50C into the key accommodating groove 355, and the step S14 of attaching the first rotor blade 32A.

Figure 20:
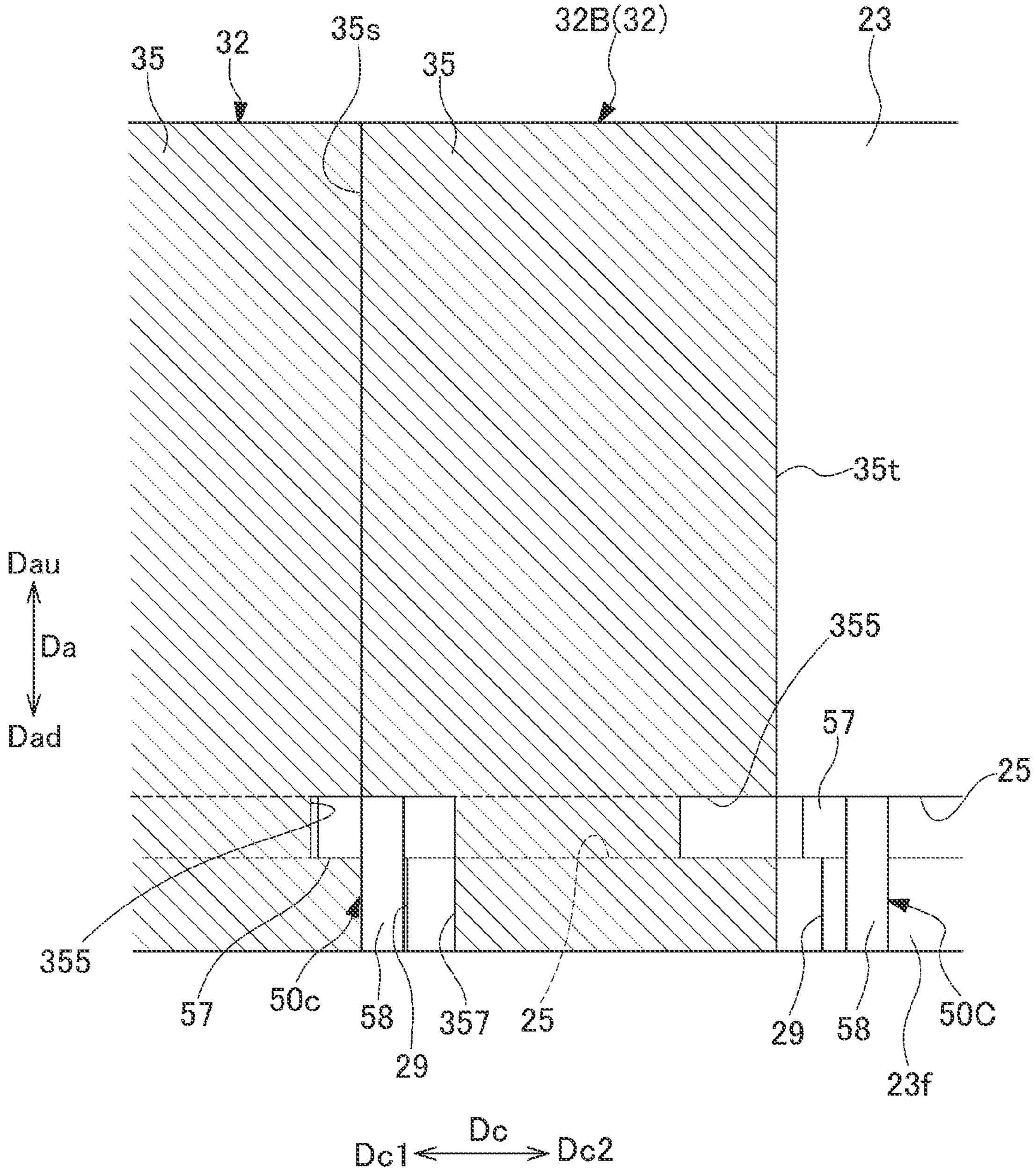
FIG. 20 is a cross-sectional view showing a step of inserting a key into a circumferential groove as viewed from a radial direction, in the method for fixing a rotor blade according to the third embodiment of the present disclosure.
Figure 21:
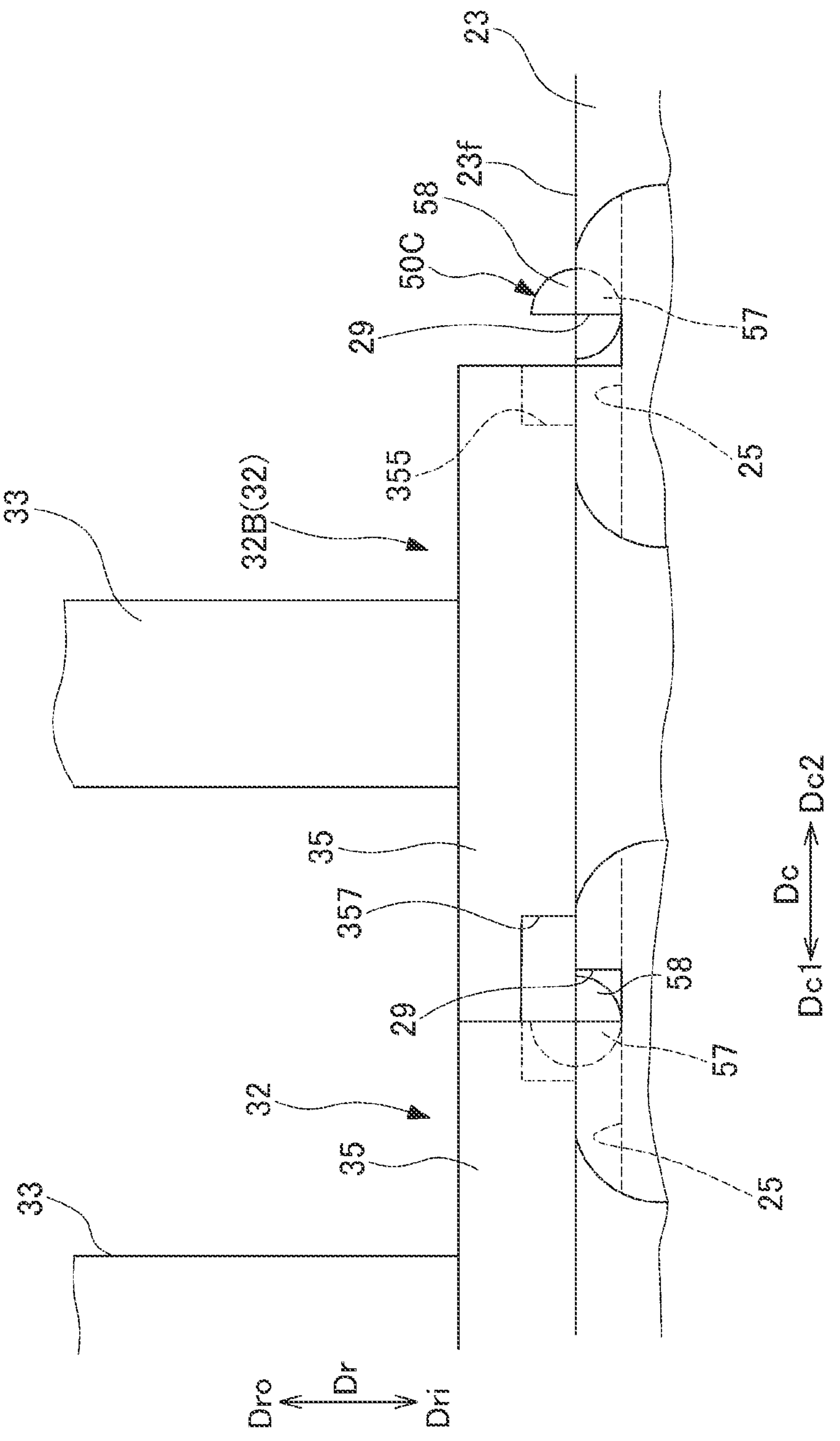
FIG. 21 is a cross-sectional view showing a step of inserting the key into the circumferential groove as viewed from an axial direction, in the method for fixing a rotor blade according to the third embodiment of the present disclosure.

The step S11 of attaching the second rotor blade 32B is performed in the same manner as in the first embodiment. After that, in the step S32 of inserting the key 50C into the circumferential groove 25, as shown in FIGS. 20 and 21, the key main portion 57 of the key 50C is inserted into the circumferential groove 25. In the step S32 of the present embodiment, one key 50C is attached to the disk portion 23 to which the second rotor blade 32B is attached. The key main portion 57 is inserted into the circumferential groove 25 at a position shifted from the position where the second rotor blade 32B is arranged in the circumferential direction Dc when viewed from the radial direction Dr. At that time, the key main portion 57 formed in a semicircular shape when viewed from the axial direction Da is arranged to fit in the circumferential groove 25. Meanwhile, the key stopper portion 58 is arranged on the outer side Dro in the radial direction Dr from the outer peripheral surface 23*f* of the disk portion 23. That is, when viewed from the axial direction Da, the key stopper portion 58 is arranged in a state where the key stopper portion 58 protrudes from the outer peripheral surface 23*f* of the disk portion 23.

Figure 22:
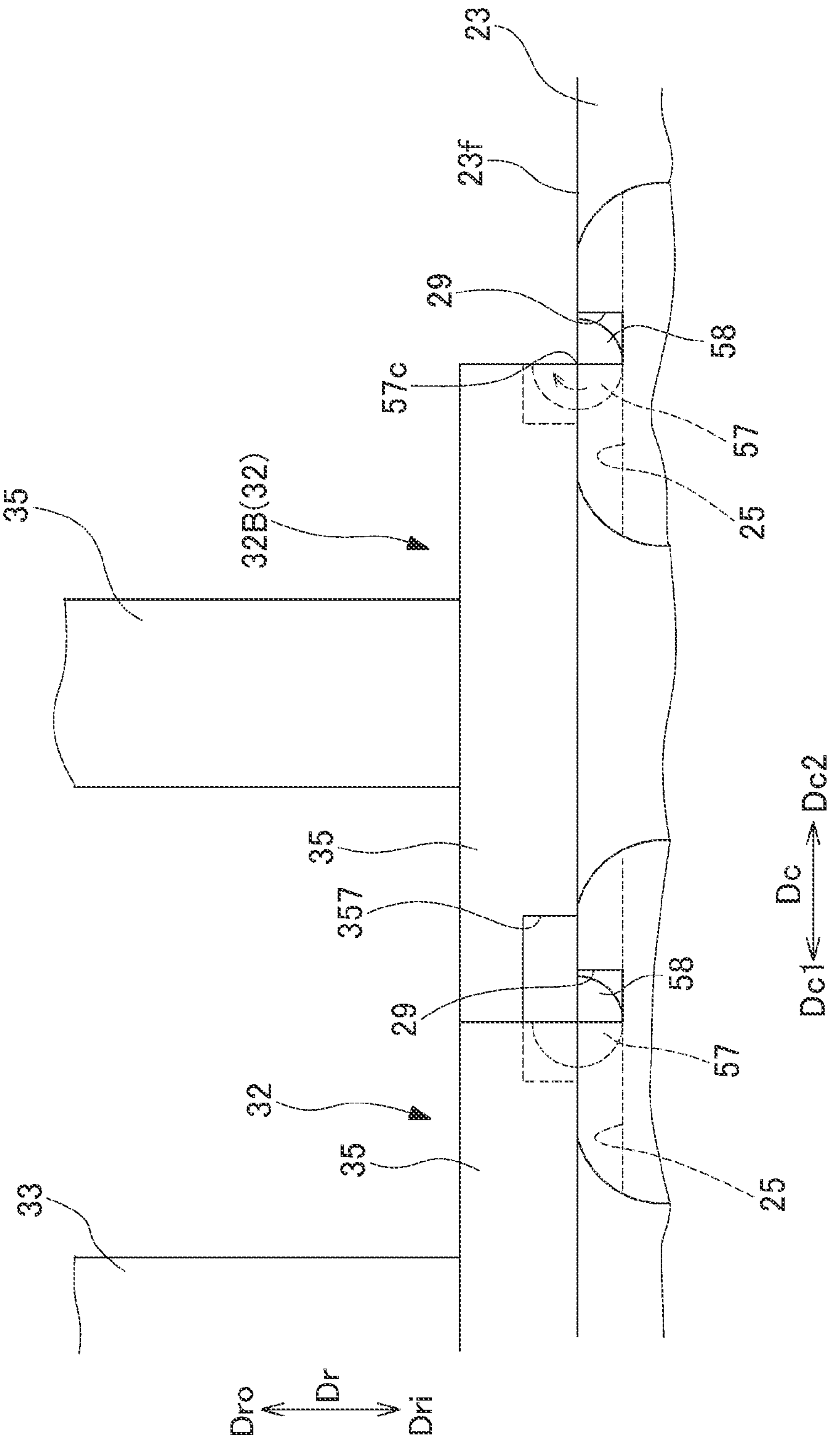
FIG. 22 is a cross-sectional view showing a step of inserting the key into a key accommodating groove as viewed from the axial direction, in the method for fixing a rotor blade according to the third embodiment of the present disclosure.

In the step S33 of inserting the key 50C into the key accommodating groove 355, the key 50C is moved to the circumferential direction Dc in the circumferential groove 25, and the key main portion 57 is inserted into the key accommodating groove 355. The key main portion 57 is moved from a position shifted in the circumferential direction Dc with respect to the position where the second rotor blade 32B is arranged to a position where the second rotor blade 32B is arranged. After that, as shown in FIG. 22, the key stopper portion 58 is rotated by 90° about the central axis 57*c*. As a result, the key main portion 57 also rotates by 90°, and the posture of the key main portion 57 changes to become longer in the radial direction Dr. That is, when viewed from the axial direction Da, the posture changes from a state where a plane portion forming the diameter of the key main portion 57 faces the radial direction Dr to a state where the plane portion faces the circumferential direction Dc. As a result, a part of the key main portion 57 is inserted into the key accommodating groove 355. Therefore, the key main portion 57 is in a state of being inserted into the key accommodating groove 355 and the circumferential groove 25 of the second rotor blade 32B. As a result, the second rotor blade 32B is restrained from moving in the axial direction Da with respect to the disk portion 23 by the key main portion 57. Further, in a state where the key main portion 57 is inserted into the key accommodating groove 355 and the circumferential groove 25, the key stopper portion 58 enters the axial groove 29. As a result, the key stopper portion 58 becomes immovable in the circumferential direction Dc in the axial groove 29. Therefore, the movement of the key main portion 57 approaching the access groove side surface 357*s* in the circumferential direction Dc is restrained. Accordingly, the movement of the key 50C in the circumferential direction Dc is restrained. As a result, the attachment of the first rotor blade 32A and the second rotor blade 32B to the disk portion 23 is completed. After that, as in the first embodiment, each step is repeatedly performed, and thus, all the rotor blades 32 of one rotor blade row 31 are attached to the disk portion 23.

(Action Effect)

In the third embodiment, the second rotor blade 32B is fixed in a state where the second rotor blade 32B is immovable in the axial direction Da with respect to the disk portion 23 by the key main portion 57 arranged in the circumferential groove 25 and the key accommodating groove 355. The key main portion 57 is rotated in the circumferential groove 25 with respect to the second rotor blade 32B in which the blade root 36 is inserted into the blade embedding groove 28, and thus, inserted into the key accommodating groove 355. Thereby, the rotor blade 32 can be easily and reliably restrained by the key 50C.

Further, the key main portion 57 is rotated and inserted into the key accommodating groove 355, so that the key stopper portion 58 is inserted into the axial groove 29. The key stopper portion 58 is in a state of being immovable in the circumferential direction Dc in the axial groove 29. Therefore, the movement of the key 50C in the circumferential direction Dc is restrained in a state where the key stopper portion 58 is accommodated in the axial groove 29. That is, the movement of the key 50C in the circumferential direction Dc can be restrained without using a structure that is plastically deformed like the punching portion. As a result, it is possible to prevent the key main portion 57 from moving to come out from the inside of the key accommodating groove 355 to the other side Dc2 in the circumferential direction Dc due to vibration or the like during the operation of the steam turbine 1. As a result, the state where the movement of the second rotor blade 32B in the axial direction Da is restrained by the key 50C can be stably and more stably maintained.

Modification Examples of Other Embodiments

In the above-described embodiments and the modification examples thereof, the procedure in the method for fixing the rotor blade has been described, but the procedure can be changed as appropriate.

For example, in the above embodiments, after the second rotor blade 32B is restrained by the keys 50A to 50C, the first rotor blade 32A is installed on the other side in the circumferential direction Dc with respect to the second rotor blade 32B. However, the present disclosure is not limited to being assembled in this order. For example, the keys 50A to 50C may be arranged in the circumferential groove 25 in advance on the disk portion 23 before the second rotor blade 32B. Further, for example, after all the keys 50A to 50C are arranged on the disk portion 23, all the rotor blades 32 may be attached over the entire circumference in the circumferential direction Dc. In this case, the keys 50A to 50C may be moved and the restraining members 60 and 60B may be installed through the access groove 357 formed in the arranged rotor blades 32. At that time, a jig that is inserted into the access groove 357 to assist the movements of the keys 50A to 50C may be used.

Further, the shapes of the keys 50A to 50C and the restraining members 60 and 60B are not limited to the shapes of the above-described embodiments. The shapes of the keys 50A to 50C may be any shape that can restrict the movement of the rotor blade 32 with respect to the disk portion 23. At that time, the shapes of the circumferential groove 25 and the key accommodating groove 355 are appropriately changed according to the shapes of the keys 50A to 50C. The restraining members 60 and 60B may have a shape that can restrain the movement of the key 50A. At that time, the shape of the access groove 357 is appropriately changed according to the shapes of the restraining members 60 and 60B.

<Additional Note>

The rotors 20 to 20C of the steam turbine 1, the steam turbine 1, and the method S10 for fixing the rotor blade 32 according to each embodiment are grasped as follows, for example.

(1) According to a first aspect, there are provided rotors 20 to 20C of a steam turbine 1, the rotors 20 to 20C include a shaft core portion 22 formed in a columnar shape about an axis Ar; a disk portion 23 extending to an outer side Dro in a radial direction Dr with respect to the shaft core portion 22, in which the radial direction Dr is based on the axis Ar; a plurality of rotor blades 32 attached to the disk portion 23; and keys 50A to 50C configured to restrict movement of each of the plurality of rotor blades 32 with respect to the disk portion 23 in an axial direction Da in which the axis Ar extends, in which the disk portion 23 includes a plurality of blade embedding grooves 28 recessed to an inner side Dri in the radial direction Dr from an outer peripheral surface 23*f* of the disk portion 23, extending in the axial direction Da, and formed at intervals in a circumferential direction Dc about the axis Ar, and a circumferential groove 25 recessed to the inner side Dri in the radial direction Dr from the outer peripheral surface 23*f* and extending in the circumferential direction Dc, each of the plurality of rotor blades 32 includes a blade root 36 embedded in each of the blade embedding grooves 28, a platform 35 arranged on the outer side Dro in the radial direction Dr with respect to the disk portion 23 and protruding to both sides in the circumferential direction Dc with respect to the blade root 36, and a blade body 33 extending to the outer side Dro in the radial direction Dr from the platform 35, the plurality of rotor blades 32 include a first rotor blade 32A and a second rotor blade 32B adjacent to the first rotor blade 32A on one side Dc1 in the circumferential direction Dc, the platform 35 of the first rotor blade 32A includes a first side surface 35*s* of the second rotor blade 32B facing the platform 35 of the second rotor blade 32B in the circumferential direction Dc, a first end surface 35*d* facing the axial direction Da, and an access groove 357 recessed to open in the axial direction Da and the circumferential direction Dc at a corner portion 35*c* formed by the first side surface 35*s* and the first end surface 35*d* and communicating with the circumferential groove 25, the platform 35 of the second rotor blade 32B includes a second side surface 35*t* facing the first side surface 35*s* in the circumferential direction Dc, and a key accommodating groove 355 recessed in the circumferential direction Dc from the second side surface 35*t*, communicating with the circumferential groove 25 in the radial direction Dr, and communicating with the access groove 357 in the circumferential direction Dc, and the keys 50A to 50C are arranged in the circumferential groove 25 and the key accommodating groove 355.

In the rotors 20 to 20C of the steam turbine 1, the rotor blade is fixed in a state where the rotor blade is immovable in the axial direction Da with respect to the disk portion 23 by the keys 50A to 50C arranged in the circumferential groove 25 and the key accommodating groove 355. The keys 50A to 50C are moved in the circumferential direction Dc in the circumferential groove 25 with respect to the second rotor blade 32B in which the blade root 36 is inserted into the blade embedding groove 28, and thus, the keys 50A to 50C are also inserted into the key accommodating groove 355. As a result, the second rotor blade 32B cannot move in the axial direction Da with respect to the keys 50A to 50C accommodated in the circumferential groove 25. Therefore, simply by moving the keys 50A to 50C in the circumferential groove 25 and arranging the keys 50A to 50C in the circumferential groove 25 and the key accommodating groove 355, the second rotor blade 32B can be reliably fixed in a state of being immovable with respect to the disk portion 23. In this way, the rotor blade 32 can be easily and reliably restrained by the key 50A.

(2) In the rotors 20 to 20C of a steam turbine 1 according to a second aspect, in the rotors 20 to 20C of a steam turbine 1 of (1), when viewed from the radial direction Dr, the circumferential groove 25 extends in the circumferential direction Dc from a position overlapping the platform 35 of the second rotor blade 32B to a position overlapping the platform 35 of the first rotor blade 32A and communicates with the access groove 357 in the radial direction Dr.

As a result, even after the blade root 36 of the second rotor blade 32B is embedded in the blade embedding groove 28, the key 50A can be inserted into the circumferential groove 25 at the position where the first rotor blade 32A shifted in the circumferential direction Dc with respect to the second rotor blade 32B is arranged. After that, by simply moving the key 50A in the circumferential direction Dc in the circumferential groove 25, and the key 50A can be inserted into the key accommodating groove 355 of the second rotor blade 32B without interfering with the second rotor blade 32B. Therefore, the second rotor blade 32B can be fixed to the disk portion 23 by the key 50A regardless of the order in which the second rotor blade 32B and the key 50A are attached.

(3) In the rotor 20 of a steam turbine 1 according to a third aspect, in the rotor 20 of a steam turbine 1 of (1) or (2), the access groove 357 has an access groove side surface 357*s* facing the second side surface 35*t* in the circumferential direction Dc, and the rotor further includes a restraining member 60 arranged between the key 50A and the access groove side surface 357*s* in the circumferential direction Dc in the access groove 357 and restraining movement of the key 50A approaching the access groove side surface 357*s* in the circumferential direction Dc.

As a result, by inserting the restraining member 60 between the key 50A and the access groove side surface 357*s*, the key 50A arranged in the circumferential groove 25 and the key accommodating groove 355 is restrained from moving in the circumferential direction Dc. Therefore, it is possible to prevent the key 50A from coming out of the circumferential groove 25 and the key accommodating groove 355. As a result, the key 50A can be prevented from coming off from the circumferential groove 25, and the state where the movement of the second rotor blade 32B in the axial direction Da can be restrained can be stably maintained. Further, the restraining member 60 is arranged between the key 50A and the access groove side surface 357*s* in the access groove 357. Therefore, even when the plurality of rotor blades 32 (first rotor blade 32A and second rotor blade 32B) and the key 50A is attached to the disk portion 23, the restraining member 60 can be accessed through the access groove 357. That is, even when the first rotor blade 32A and the second rotor blade 32B are fixed to the disk portion 23, the restraining member 60 can be attached or detached. Therefore, by attaching/detaching the restraining member 60 to/from the access groove 357, the fixing of the second rotor blade 32B by the key 50A can be easily released.

(4) In the rotor 20 of a steam turbine 1 according to a fourth aspect, in the rotor 20 of a steam turbine 1 of (3), the restraining member 60B includes an insertion portion 601 arranged between the key 50A and the access groove side surface 357*s* in the axial direction Da, and a rotation restriction portion 602 integrally formed with the insertion portion 601 at a position close to the first end surface 35*d* in the axial direction Da with respect to the insertion portion 601 and restricting rotation of the insertion portion 601 in the access groove 357 when viewed from the radial direction Dr.

Therefore, the restraining member 60B is prevented from rotating about a virtual axis extending in the radial direction Dr when viewed from the radial direction Dr in the access groove 357. As a result, it is possible to more stably maintain the state where the key 50A by the insertion portion 601 is restrained from moving to the other side Dc2 in the circumferential direction Dc.

(5) In the rotor 20B of a steam turbine 1 according to a fifth aspect, in the rotor 20B of a steam turbine 1 of (3) or (4), the disk portion 23 includes a punching portion 100P formed on a disk surface 23*d* facing the axial direction Da to be orthogonal to the outer peripheral surface 23*f* and recessed from the disk surface 23*d* to deform the outer peripheral surface 23*f* adjacent the access groove 357 when viewed from the axial direction Da, and the restraining member 60 is restrained from moving in the circumferential direction Dc by the punching portion 100P.

As a result, the outer peripheral surface 23*f* is deformed by the punching portion 100P and the shape of the circumferential groove 25 is changed, so that the movement of the restraining member 60 is restrained. As a result, it is possible to prevent the restraining member 60 from naturally falling out of the access groove 357 due to vibration or the like during operation of the steam turbine 1. Therefore, the state where the movement of the second rotor blade 32B in the axial direction Da by the key 50A is restrained can be maintained more stably.

(6) In the rotor 20B of a steam turbine 1 according to a sixth aspect, in the rotor 20B of a steam turbine 1 of (1) or (2), the access groove 357 has an access groove side surface 357*s* facing the second side surface 35*t* in the circumferential direction Dc, the key 50B integrally includes a key body portion 53 inserted into the circumferential groove 25, the key accommodating groove 355, and the access groove 357, and a key extension portion 54 extending in the axial direction Da from the key body portion 53 in the access groove 357, the disk portion 23 includes a punching portion 100Q formed on a disk surface 23*d* facing the axial direction Da to be orthogonal to the outer peripheral surface 23*f* and recessed from the disk surface 23*d* to deform the outer peripheral surface 23*f* adjacent the access groove 357 when viewed from the axial direction Da, and the key extension portion 54 is restrained from moving toward the access groove side surface 357*s* in the circumferential direction Dc by the punching portion 100Q.

As a result, the outer peripheral surface 23*f* is deformed by the punching portion 100Q and the shape of the circumferential groove 25 is changed, so that the movement of the key extension portion 54 extending from the key body portion 53 is restrained. Therefore, the movement of the key body portion 53 is also restrained. Accordingly, it is possible to prevent the key body portion 53 from moving to come out in the circumferential direction Dc from the inside of the key accommodating groove 355 due to vibration or the like during the operation of the steam turbine 1. As a result, the state where the movement of the second rotor blade 32B in the axial direction Da is restrained by the key 50B can be maintained more stably without using a member other than the key 50B. Further, the key extension portion 54 extends from the key body portion 53 in the access groove 357 in the axial direction Da. Therefore, the key body portion 53 in the circumferential groove 25 can be easily moved to the circumferential direction Dc through the key extension portion 54 in the access groove 357. That is, even when the first rotor blade 32A and the second rotor blade 32B are fixed to the disk portion 23, the key body portion 53 can be inserted or removed from the key accommodating groove 355. Therefore, by moving the key extension portion 54, the fixing of the second rotor blade 32B by the key 50B can be easily released.

(7) In the rotor 20C of a steam turbine 1 according to a seventh aspect, in the rotor 20C of a steam turbine 1 of (1) or (2), the access groove 357 has an access groove side surface 357*s* facing the second side surface 35*t* in the circumferential direction Dc, the disk portion 23 further includes an axial groove 29 extending in the axial direction Da to be recessed to the inner side Dri in the radial direction Dr from the outer peripheral surface 23*f* and communicating with the circumferential groove 25 and the access groove 357, and the key 50C integrally includes a key main portion 57 inserted into the circumferential groove 25 and the key accommodating groove 355, and a key stopper portion 58 extending in the axial direction Da from the key main portion 57, arranged in the axial groove 29, and restraining movement of the key main portion 57 approaching the access groove side surface 357*s* in the circumferential direction Dc.

As a result, the key stopper portion 58 is in a state of being immovable in the circumferential direction Dc in the axial groove 29. Therefore, the movement of the key 50C in the circumferential direction Dc is restrained in a state where the key stopper portion 58 is accommodated in the axial groove 29. That is, the movement of the key 50C in the circumferential direction Dc can be restrained without using a structure that is plastically deformed like the punching portion. As a result, it is possible to prevent the key main portion 57 from moving to come out from the inside of the key accommodating groove 355 to the other side Dc2 in the circumferential direction Dc due to vibration or the like during the operation of the steam turbine 1. As a result, the state where the movement of the second rotor blade 32B in the axial direction Da is restrained by the key 50C can be stably and more stably maintained.

(8) According to an eighth aspect, there is provided a steam turbine 1 including the rotors 20 to 20C of a steam turbine 1 according to any one of (1) to (7).

As a result, by providing the rotors of the steam turbine 1 described above, the rotor blade 32 can be easily and reliably restrained by the keys 50A to 50C at the time of assembling the steam turbine 1, maintenance of the rotors 20 to 20C, and the like.

(9) According to a ninth aspect, there are provided methods S10, S20, and S30 for fixing the rotor blade 32 in the rotors 20 to 20C of a steam turbine 1 according to any one of (1) to (7), the methods including steps S11, S21, and S31 of attaching the second rotor blade 32B to the disk portion 23; steps S12, S22, and S32 of inserting the keys 50A to 50C into the circumferential groove 25; steps S13, S23, and S33 of moving the keys 50A to 50C in the circumferential direction Dc in the circumferential groove 25 and inserting the keys 50A to 50C into the key accommodating groove 355; and steps S14, S25, and S35 of attaching the first rotor blade 32A to the disk portion 23.

As a result, the rotor blade is fixed in an immovable state in the axial direction Da with respect to the disk portion 23 by the keys 50A to 50C arranged in the circumferential groove 25 and the key accommodating groove 355. The keys 50A to 50C are moved in the circumferential direction Dc in the circumferential groove 25 with respect to the second rotor blade 32B in which the blade root 36 is inserted into the blade embedding groove 28, and thus, the keys 50A to 50C are also inserted into the key accommodating groove 355. As a result, the second rotor blade 32B cannot move in the axial direction Da with respect to the keys 50A to 50C accommodated in the circumferential groove 25. Therefore, simply by moving the keys 50A to 50C in the circumferential groove 25 and arranging the keys 50A to 50C in the circumferential groove 25 and the key accommodating groove 355, the second rotor blade 32B can be reliably fixed in a state of being immovable with respect to the disk portion 23. In this way, the rotor blade 32 can be easily and reliably restrained by the key 50A.

EXPLANATION OF REFERENCES

1: steam turbine
10: casing
11: nozzle chamber
12: main flow path chamber
13: exhaust chamber
15: steam main flow path
15*w*: inter-blade flow path
20, 20B, 20C: rotor
21: rotor shaft
22: shaft core portion
23: disk portion
23*d*: disk surface
23*f*: outer peripheral surface
25: circumferential groove
28: blade embedding groove
28*a*: engaging concave portion
29: axial groove
31: rotor blade row
32: rotor blade
32A: first rotor blade
32B: second rotor blade
33: blade body
34: shroud
35: platform
35*c*: corner portion
35*d*: first end surface
35*f*: platform inner peripheral surface
35*g*: platform outer peripheral surface
35*s*: first side surface
35*t*: second side surface
36: blade root
36*t*: engaging convex portion
41: stator vane row
42: stator vane
43: outer ring
46: inner ring
50A to 50C: key
51*e*: end portion
53: key body portion
53*e*: end portion
54: key extension portion
54*d*: end portion
57: key main portion
58: key stopper portion
58*d*: end portion
60, 60B: restraining member
60*d*: end portion
601: insertion portion
602: protrusion portion (rotation restriction portion)
100P, 100Q: punching portion
355: key accommodating groove
357: access groove
357*d*: access groove end surface
357*s*: access groove side surface
505: key end surface
Ar: axis
Da: axial direction
Dad: downstream side
Dau: upstream side
Dc: circumferential direction
Dc1: one side
Dc2: the other side
Dr: radial direction
Dri: inner side
Dro: outer side
S: steam
S10, S20, S30: method for fixing rotor blade
S11: step of attaching second rotor blade
S12, S22, S32: step of inserting key into circumferential groove
S13, S23, S33: step of inserting key into key accommodating groove
S14: step of attaching first rotor blade
S15: step of arranging restraining member
S16: step of fixing restraining member
S24: step of fixing key

What is claimed is:

1. A rotor of a steam turbine, the rotor comprising:
a shaft core portion formed in a columnar shape about an axis;
a disk portion extending to an outer side in a radial direction with respect to the shaft core portion, wherein the radial direction is based on the axis;
a plurality of rotor blades attached to the disk portion; and
a key configured to restrict movement of each of the plurality of rotor blades with respect to the disk portion in an axial direction in which the axis extends, wherein
the disk portion includes a plurality of blade embedding grooves recessed to an inner side in the radial direction from an outer peripheral surface of the disk portion, and formed at intervals in a circumferential direction about the axis, and a circumferential groove recessed to the inner side in the radial direction from the outer peripheral surface and extending in the circumferential direction,
the plurality of blade embedding grooves extend in the axial direction,
each of the plurality of rotor blades includes
a blade root embedded in each of the plurality of blade embedding grooves,
a platform arranged on the outer side in the radial direction with respect to the disk portion and protruding to both sides in the circumferential direction with respect to the blade root, and
a blade body extending to the outer side in the radial direction from the platform,
the plurality of rotor blades include a first rotor blade and a second rotor blade adjacent to the first rotor blade on one side in the circumferential direction,
the platform of the first rotor blade includes
a first side surface facing the platform of the second rotor blade in the circumferential direction,
a first end surface facing the axial direction, and
an access groove recessed to open in the axial direction and the circumferential direction at a corner portion formed by the first side surface and the first end surface and communicating with the circumferential groove, the platform of the second rotor blade includes a second side surface facing the first side surface in the circumferential direction, and a key accommodating groove recessed in the circumferential direction from the second side surface, communicating with the circumferential groove in the radial direction, and communicating with the access groove in the circumferential direction, the key is arranged in the circumferential groove and the key accommodating groove, the access groove has an access groove side surface facing the second side surface in the circumferential direction, the rotor further comprises a restraining member arranged between the key and the access groove side surface in the circumferential direction in the access groove and restraining movement of the key approaching the access groove side surface in the circumferential direction, the disk portion includes a punching portion formed on a disk surface and recessed from the disk surface to deform the outer peripheral surface adjacent the access groove when viewed from the axial direction, the disk surface faces the axial direction to be orthogonal to the outer peripheral surface, and the restraining member is restrained from moving in the circumferential direction by the punching portion.

2. The rotor of a steam turbine according to claim 1, wherein when viewed from the radial direction, the circumferential groove extends in the circumferential direction from a position overlapping the platform of the second rotor blade to a position overlapping the platform of the first rotor blade and communicates with the access groove in the radial direction.

3. The rotor of a steam turbine according to claim 1, wherein the restraining member includes an insertion portion arranged between the key and the access groove side surface in the axial direction, and a rotation restriction portion integrally formed with the insertion portion at a position close to the first end surface in the axial direction with respect to the insertion portion and restricting rotation of the insertion portion in the access groove when viewed from the radial direction.

4. The rotor of a steam turbine according to claim 1, wherein the key integrally includes a key body portion inserted into the circumferential groove, the key accommodating groove, and the access groove, and a key extension portion extending in the axial direction from the key body portion in the access groove, the key extension portion is restrained from moving toward the access groove side surface in the circumferential direction by the punching portion.

5. The rotor of a steam turbine according to claim 1, wherein the disk portion further includes an axial groove extending in the axial direction to be recessed to the inner side in the radial direction from the outer peripheral surface and communicating with the circumferential groove and the access groove, and the key integrally includes a key main portion inserted into the circumferential groove and the key accommodating groove, and a key stopper portion extending in the axial direction from the key main portion, arranged in the axial groove, and restraining movement of the key main portion approaching the access groove side surface in the circumferential direction.

6. A steam turbine comprising the rotor of a steam turbine according to claim 1.

7. A method for fixing a rotor blade in a rotor of a steam turbine, the rotor comprising:

a shaft core portion formed in a columnar shape about an axis;

a disk portion extending to an outer side in a radial direction with respect to the shaft core portion, wherein the radial direction is based on the axis;

a plurality of rotor blades attached to the disk portion; and a key configured to restrict movement of each of the plurality of rotor blades with respect to the disk portion in an axial direction in which the axis extends, the disk portion including a plurality of blade embedding grooves recessed to an inner side in the radial direction from an outer peripheral surface of the disk portion, and formed at intervals in a circumferential direction about the axis, and a circumferential groove recessed to the inner side in the radial direction from the outer peripheral surface and extending in the circumferential direction, the plurality of blade embedding grooves extending in the axial direction, each of the plurality of rotor blades including a blade root embedded in each of the plurality of blade embedding grooves, a platform arranged on the outer side in the radial direction with respect to the disk portion and protruding to both sides in the circumferential direction with respect to the blade root, and a blade body extending to the outer side in the radial direction from the platform, the plurality of rotor blades including a first rotor blade and a second rotor blade adjacent to the first rotor blade on one side in the circumferential direction, the platform of the first rotor blade including a first side surface facing the platform of the second rotor blade in the circumferential direction, a first end surface facing the axial direction, and an access groove recessed to open in the axial direction and the circumferential direction at a corner portion formed by the first side surface and the first end surface and communicating with the circumferential groove, the platform of the second rotor blade including a second side surface facing the first side surface in the circumferential direction, and a key accommodating groove recessed in the circumferential direction from the second side surface, communicating with the circumferential groove in the radial direction, and communicating with the access groove in the circumferential direction, and the key being arranged in the circumferential groove and the key accommodating groove, the method comprising:

a step of attaching the second rotor blade to the disk portion;

a step of inserting the key into the circumferential groove;

a step of moving the key in the circumferential direction in the circumferential groove and inserting the key into the key accommodating groove; and a step of attaching the first rotor blade to the disk portion.

* * * * *